(12) United States Patent
Tsuchimura et al.

(10) Patent No.: US 7,287,232 B2
(45) Date of Patent: Oct. 23, 2007

(54) INFORMATION DISPLAY SYSTEM HAVING GRAPHICAL USER INTERFACE SWITCHINGLY CONTROLLING INFORMATION DISPLAY ON DISPLAY SCREEN

(75) Inventors: Tadao Tsuchimura, Kawasaki (JP); Takeshi Tomaru, Kawasaki (JP); Asami Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 591 days.

(21) Appl. No.: 09/764,302

(22) Filed: Jan. 19, 2001

(65) Prior Publication Data
US 2001/0038394 A1 Nov. 8, 2001

(30) Foreign Application Priority Data
May 8, 2000 (JP) ............................. 2000-135030

(51) Int. Cl.
*G06F 3/00* (2006.01)
(52) U.S. Cl. ...................................... 715/792; 715/788
(58) Field of Classification Search ................ 345/764, 345/769, 792, 810, 848–852; 715/848–852, 715/764, 769, 792, 810, 834, 854, 835, 808, 715/841, 863, 788; 725/38–61
See application file for complete search history.

(56) References Cited

U.S. PATENT DOCUMENTS

| | | | | |
|---|---|---|---|---|
| 5,060,170 A | * | 10/1991 | Bourgeois et al. | 345/788 |
| 5,237,648 A | * | 8/1993 | Mills et al. | 345/723 |
| 5,596,699 A | * | 1/1997 | Driskell | 715/834 |
| 5,623,681 A | * | 4/1997 | Rivette et al. | 715/522 |
| 5,678,015 A | * | 10/1997 | Goh | 715/782 |
| 5,684,511 A | * | 11/1997 | Westerink et al. | 345/157 |
| 5,712,995 A | | 1/1998 | Cohn | |
| 5,828,360 A | * | 10/1998 | Anderson et al. | 715/834 |

(Continued)

FOREIGN PATENT DOCUMENTS

EP 0 279 652 8/1988

(Continued)

OTHER PUBLICATIONS

Communication dated Oct. 14, 2003 from the European Patent Office including a partial European Search Report.

(Continued)

*Primary Examiner*—Kristine Kincaid
*Assistant Examiner*—Lê Nguyen
(74) *Attorney, Agent, or Firm*—Staas & Halsey LLP

(57) ABSTRACT

Disclosed is an information display system capable of efficiently browsing items of information related by links. When displaying the information obtained by accessing a network, a plurality of display areas are formed, and plural items of information are displayed in these display areas. In this case, a display history of the information displayed may be stored, and the items of information displayed at the present or in the past may be displayed in a predetermined order in the respective display areas. When a first item of information displayed in a first display area is related to a second item of information, and when given an indication of displaying a second item of information, the second item of information may be displayed in a second display area while keeping the display of the first item of information in the first display area.

12 Claims, 27 Drawing Sheets

U.S. PATENT DOCUMENTS

| | | | |
|---|---|---|---|
| 5,895,462 A | 4/1999 | Toki | 707/3 |
| 5,917,483 A | 6/1999 | Duncan et al. | |
| 5,974,572 A * | 10/1999 | Weinberg et al. | 714/47 |
| 6,008,809 A | 12/1999 | Brooks | |
| 6,025,841 A | 2/2000 | Finkelstein et al. | |
| 6,118,427 A * | 9/2000 | Buxton et al. | 345/629 |
| 6,211,874 B1 * | 4/2001 | Himmel et al. | 345/781 |
| 6,215,490 B1 * | 4/2001 | Kaply | 715/788 |
| 6,266,684 B1 * | 7/2001 | Kraus et al. | 715/513 |
| 6,351,765 B1 * | 2/2002 | Pietropaolo et al. | 709/218 |
| 6,359,635 B1 * | 3/2002 | Perttunen | 715/834 |
| 6,366,303 B1 * | 4/2002 | Venolia | 715/856 |
| 6,448,987 B1 * | 9/2002 | Easty et al. | 715/834 |
| 6,515,689 B1 * | 2/2003 | Terashima | 715/856 |
| 6,549,219 B2 * | 4/2003 | Selker | 715/834 |
| 6,636,197 B1 * | 10/2003 | Goldenberg et al. | 345/156 |
| 6,667,751 B1 * | 12/2003 | Wynn et al. | 345/833 |
| 6,832,355 B1 * | 12/2004 | Duperrouzel et al. | 715/788 |

FOREIGN PATENT DOCUMENTS

| | | |
|---|---|---|
| EP | 0 412 924 A2 | 7/1990 |
| EP | 0957438 A2 | 11/1999 |
| JP | A-5-119946 | 5/1993 |
| JP | A-8-149387 | 6/1996 |
| JP | 09-259128 | 3/1997 |
| JP | A-9-223084 | 8/1997 |
| JP | A-10-105334 | 4/1998 |
| JP | A-10-171755 | 6/1998 |
| JP | A-10-207898 | 8/1998 |
| JP | A-11-306317 | 11/1999 |
| JP | A-2000-20384 | 1/2000 |
| WO | WO99/46651 | 9/1999 |

OTHER PUBLICATIONS

Communication dated Dec. 12, 2003 from the European Patent Office including a European Search Report.

PolyTRIM Documentation, Internet Article, 'Online! 1994, pp. 1-5, Centre for Landscape Research, University of Toronto, URL:http://www.clr.toronto.edu:1080/POLYTRIM/ptdoc/RTF/PT-AppB-CourseNotes.rtf.Z.ht . . .

* cited by examiner

FIG.3

| ENTRY NUMBER (CHANNEL NUMBER) | URL |
|---|---|
| 1 | http://www.xxxxxx1.co.jp |
| 2 | http://www.xxxxxx2.co.jp |
| 3 | http://www.xxxxxx3.co.jp |
| : | : |
| : | : |
| 9 | http://www.xxxxxx9.co.jp |

FIG.8

| ENTRY NUMBER | HISTORY NUMBER | URL |
|---|---|---|
| 1 | 1 | http://www.xxxxxx1.co.jp |
| 2 | 4 | http://www.xxxxxx4.co.jp |
| 3 | 2 | http://www.xxxxxx2.co.jp |
| : | : | : |
| : | : | : |
| 9 | 3 | http://www.xxxxxx3.co.jp |

FIG.20

| PRESENT POSITION | MOVED POSITION | ORDER OF MOVEMENT |
|---|---|---|
| 1 | LEFT UPPER END | 1 |
| | RIGHT UPPER END | 2 |
| | LEFT LOWER END | 3 |
| | RIGHT LOWER END | 4 |
| | CENTER | 5 |
| | LEFT MIDDLE END | 6 |
| | RIGHT MIDDLE END | 7 |
| | MIDDLE UPPER END | 8 |
| | MIDDLE LOWER END | 9 |

INFORMATION DISPLAY SYSTEM HAVING GRAPHICAL USER INTERFACE SWITCHINGLY CONTROLLING INFORMATION DISPLAY ON DISPLAY SCREEN

BACKGROUND OF THE INVENTION

The present invention relates to an information display system having a graphical user interface (GUI).

With a spread of the Internet over the recent years, a technology of readily browsing the information has been demanded. As a result, an information display system incorporating a program known as a browser was developed. The conventional browser has only one display area, and hence the user switches over a page by updating the information in that display area by overwriting, or starting another browser and displaying the information thereon, or rewriting a content in the same display area by selecting an index called a tab.

Generally, the information browsed on the Internet takes a structure called a web, in which plural pieces of information are linked. This mechanism for connecting the information to the information is known as a "link". In the Internet, the user is able to browse the items of information related to each other by following the links. The links can be normally followed by clicking the information indicating the link with a pointing device such as a mouse etc.

In the conventional display system displays the information to be browsed in the single display area and is therefore very hard to use in the following applications in some cases.

(1) When the user refers to a link destination (clicks a link) from one item of information (which will hereinafter be called an original page) on the Internet, the information of the link destination is displayed by erasing the original page. Therefore, if the user tries to refer to other item of information linked to the original page, the user must executes an operation of getting [Back] to the original page each time. Further, the user must perform an operation of starting the browser again and displaying the original page thereon in order to avoid the laborious [Back] operation.

(2) The user is unable to compare two contents on the conventional one browser. For example, in the case of creating two schemes of homepage and trying to compare them with each other and of comparing commercial articles in Net shopping, the user must start the two browsers.

(3) When the user attempts to arrange plural items of information in the same screen dimensions, it takes a labor to adjust the screen dimensions of the browsers opened separately and arrange them.

(4) When the user tries to get back to a specified page after following the plurality of links, the user must return by executing the [Back] function each time. In this case, the prior art provided a function of displaying a history of having followed the links with characters of tiles of respective pages and specifying a return page. The title characters do not, however, enable the user to sufficiently grasp contents of that page. The user is therefore unable to accurately find out the desired page in the history.

(5) On the typical browser, a page exhibiting a high frequency of accessing by user is registered by utilizing a bookmark function (this page will hereinafter be referred to as a registered page). The user is, however, unable to browse a plurality of registered pages at one time.

(6) When the user attempts to monitor an image and a picture on the page updated periodically, e.g., at an interval of several minutes, if the user is tempted to browse another page until the former page is updated, there might be a possibility in which the user fails to see the updating of the former image and the picture that should be monitored.

(7) On the conventional browser, the user selects the page to be displayed by inputting an address in an address input field or picking up a desired page from a list of registered pages. The selection mode of these modes takes operating steps in which a hierarchy-structured list is displayed, and the user clicks the page with the mouse. Therefore, the user is required to refer to the hierarchy-structured list in order to select the desired page, which is complicated in terms of operation.

On the other hand, an information processing system of nowadays such as a personal computer etc uses a variety of programs such as mailer for reading mail information in addition to the browser described above, depending on a category of the information. The user operates those program in a graphical user interface (GUI) environment. A display on the screen, which is as an operation target and represents a program or information, is called an object.

In the GUI environment, a typical technique of moving this object is an operation known as a drag involving the use a pointing device. The drag is to manipulate the pointing device such as the mouse etc in a way of pulling (dragging) the object while pointing the object in order to bring the object that the user wishes to move to a position where the user wishes to move the object.

In the prior art, if the object displayed on the screen is overlaid by other object and the whole or apart of this object is invisible, the user has hitherto moved the object overlaying the former object by dragging it.

This operation method needs a space for operating the pointing device such as the mouse etc. Further, the operation of moving the object while depressing a mouse button is also required of the user. Hence, there arises a problem inherent in this operation method, wherein the operation is hard to persons advanced in age and children or persons somewhat disable in their hands.

While on the other hand, if the user sets the object displayed on the upper side in a non-display state, the problem described above is not caused. If the object overlaying indicates the information necessary for the user, however, a demand is that both of the upper and lower objects should be displayed.

SUMMARY OF THE INVENTION

It is a primary object of the present invention, which was devised to obviate the problems peculiar to the prior art, to provide an information display system capable of efficiently browsing items of information related by links.

It is another object of the present invention to provide an information display system capable of readily comparing plural items of information.

It is a further object to provide a graphical user interface for displaying plural items of information by readily switching the information.

It is a still further object of the present invention to provide operation steps of readily obviating, when a plurality of objects are overlapped with each other, this overlap of the objects in the graphical user interface.

To accomplish the above objects, according to one aspect of the present invention, an information display architecture is that a plurality of display areas into which a predetermined area is divided are provided, an information to be displayed in each display area is specified, the specified information is acquired, and the acquired information is displayed in the corresponding display area.

In this case, the information may be acquired by accessing a network.

Further, histories of items of information displayed may be stored, and the items of information stored as the display histories may be displayed in a predetermined order in the respective display areas.

When a first item of information displayed in a first display area is related to a second item of information, and when giving an indication of displaying the second item of information, the second item of information may be displayed in a second display area while keeping the display of the first item of information in the first display area.

In this case, the first item of information may be related to the second item of information by use of a specified keyword, and, when the keyword is dragged and dropped to the second display area, the second item of information may be displayed.

Based on this architecture, the plural items of information related to each other can be simultaneously displayed on the screen. Further, a labor for an operation of getting back to the display histories is saved. Moreover, there is provided a function of displaying the plural items of information arranged and comparing them.

Identifying information for identifying the display area maybe displayed, when the identifying information corresponding to the display area is specified through an operation unit, the display area corresponding to the identifying information may be enlarged, and only the single display area may be displayed.

The identifying information may be displayed within the display area identified by the identifying information, when detecting an indicating operation with respect to the identifying information, the display area corresponding to the identifying information may be enlarged.

In this case, when detecting an indication operation with respect to the identifying information, the enlarged single display area may be changed into a plurality of display areas.

According to another aspect of the present invention, in an information display architecture a turn object is provided on the screen, the turn object which includes an indicator, for indicating any one piece of identifying information from among pieces of identifying information is arranged along substantially a circumferential shape, turns about the center of the circumferential shape, an operation of the operation unit with respect to the turn object is detected, the indicator is turned in accordance with the detected operation, and the information corresponding to the identifying information indicated in the position to which the indicator is turned is displayed in the display area.

This operation is an operation effected on a pointing device having at least two pieces of buttons, and the indicator may turn counterclockwise by depressing the first button and turn clockwise by depressing the second button.

It is preferable that the two buttons are right and left buttons, the first button is the left button, and the second button is the right button.

With this contrivance, the information to be displayed can be switched by turning the turn object with a simple operation.

The turn object may have pieces of information arranged along the substantially circumferential shape and each representing the number of divisions by which the display area of the display unit is divided, when the indicator is turned to the position of indicating the information representing the number of divisions, the display area may be divided by this number of divisions, and plural items of information may be displayed in the divided display areas.

According to a further aspect of the present invention, an information display architecture is that an object including an indicator for indicating any one piece of identifying information among plural pieces of identifying information is displayed, a content of an indicating operation of an operation unit with respect to the object is detected, and the indication of the identifying information is changed in accordance with the detected content of the indicating operation.

According to a still further aspect of the present invention, an information display architecture is that when displaying an object displayed on a screen and serving as an operation target, an indicating operation of an operation unit with respect to the object is detected, and a display mode of displaying the object on the display unit is changed in accordance with the indicating operation thereof. For example, the object may be moved and displayed in a second display position by the indicating operation with respect to the object displayed in a first display position. Based on this architecture, for example, if the first object overlays the second object, it is feasible to move the first object and display the whole of the second object with a simple operation.

As discussed above, according to the present invention, the plurality of display areas are formed, and the plural items of information are displayed in the respective display area. Therefore, the items of information related by links can be efficiently displayed. Further, the two contents can be thereby easily compared with each other.

Moreover, according to the present invention, the operation effected on the turn object is detected, and the indicator is turned in accordance with this operation. Then, the information corresponding to the identifying information indicated in the position to which the indicator is turned, is displayed in the display area, and hence the plural items of information can be displayed by simply switching them.

According to the present invention, when detecting the predetermined operation effected on the object displayed in the first display position, this object is moved to and displayed in the second display position. Therefore, if the plurality of objects are overlapped, the overlap of the two objects can be easily obviated.

BRIEF DESCRIPTION OF THE DRAWINGS

FIG. 3 is a diagram showing a data structure of a channel table;

FIG. 8 is a diagram showing a data structure of a history management table;

FIG. 20 is a chart showing a data structure of a movement destination list;

DETAILED DESCRIPTION OF THE PREFERRED EMBODIMENTS

Preferred embodiments of the present invention will hereinafter be described with reference to the accompanying drawings. An information display system 1 used for a user to browse information existing on a remote disk of a host on a network or of user's own local disk, will be explained in this embodiment.

<<First Embodiment>>

A first embodiment of the present invention will hereinafter be described in conjunction with FIGS. 1 through 15.

Figure 1:
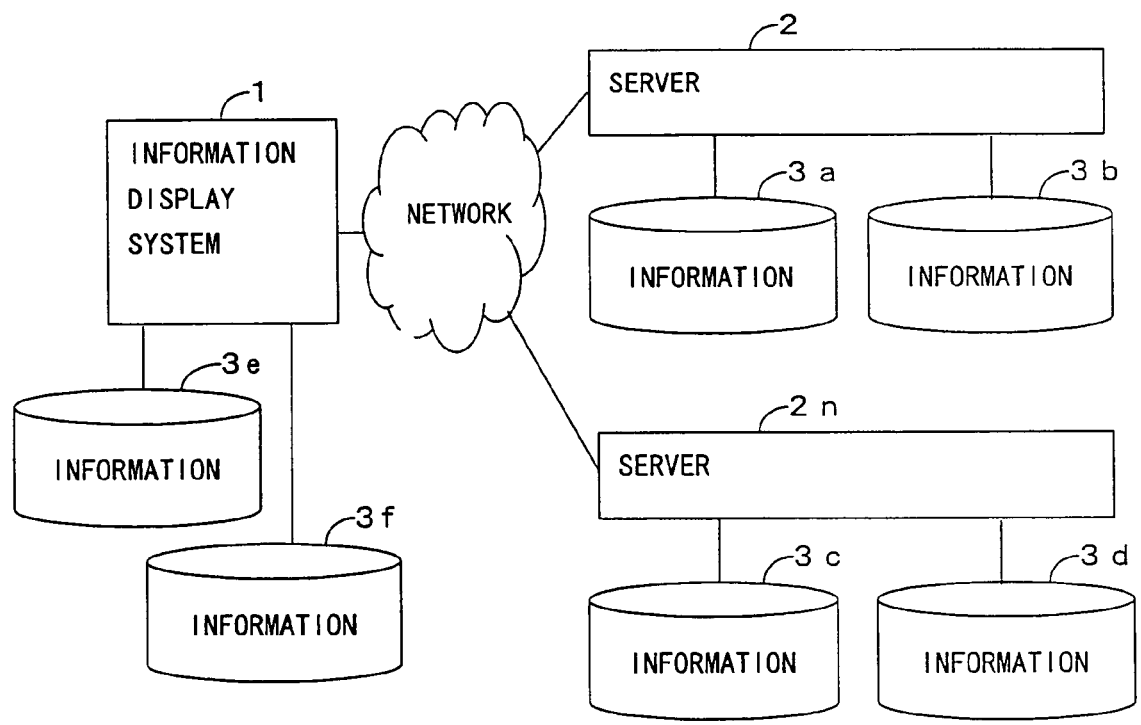
FIG. 1 is a view showing an architecture of a network in a first embodiment of the present invention.
Figure 2:
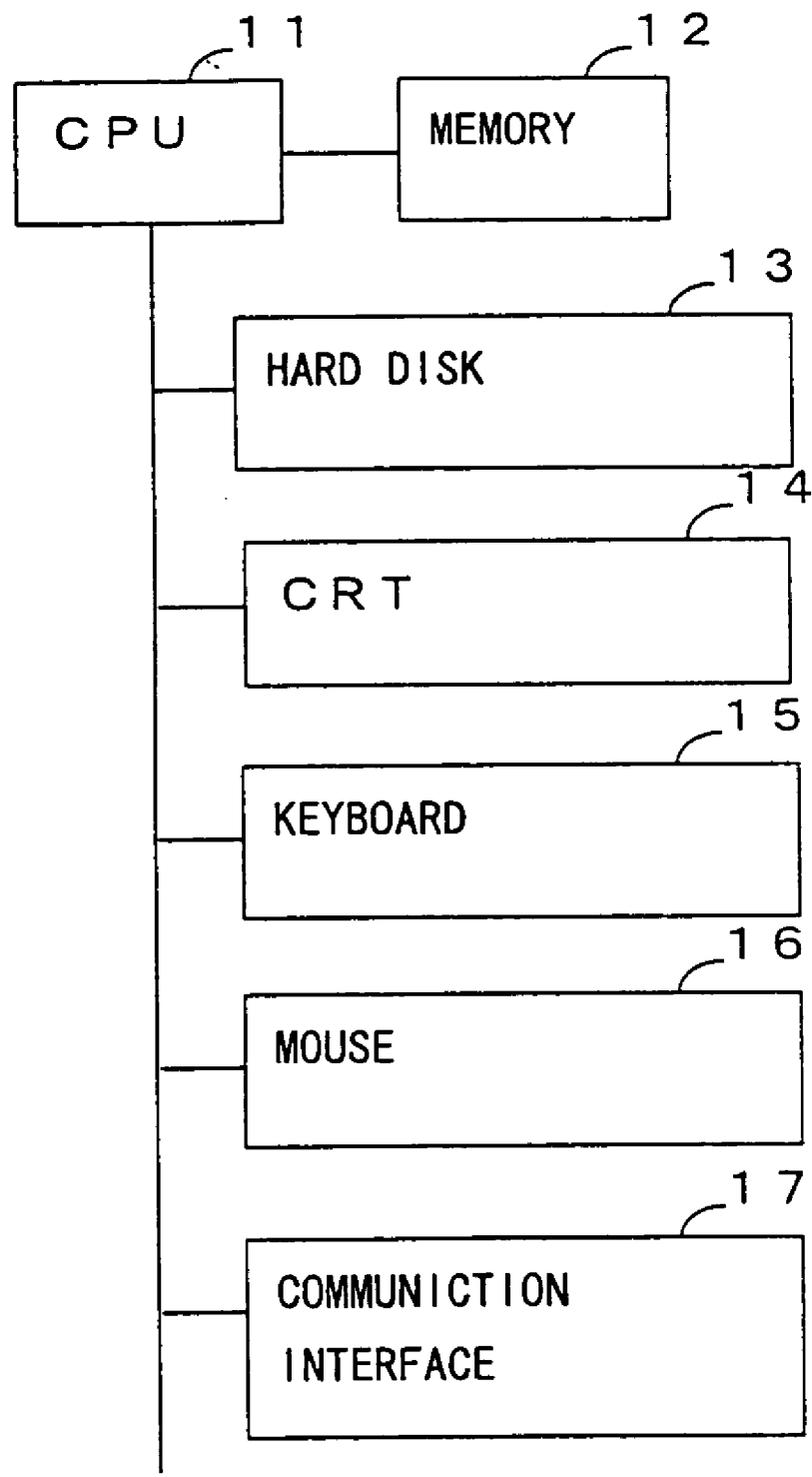
FIG. 2 is a view illustrating a hardware architecture of an information display system 1 in the first embodiment of the present invention.
Figure 4:
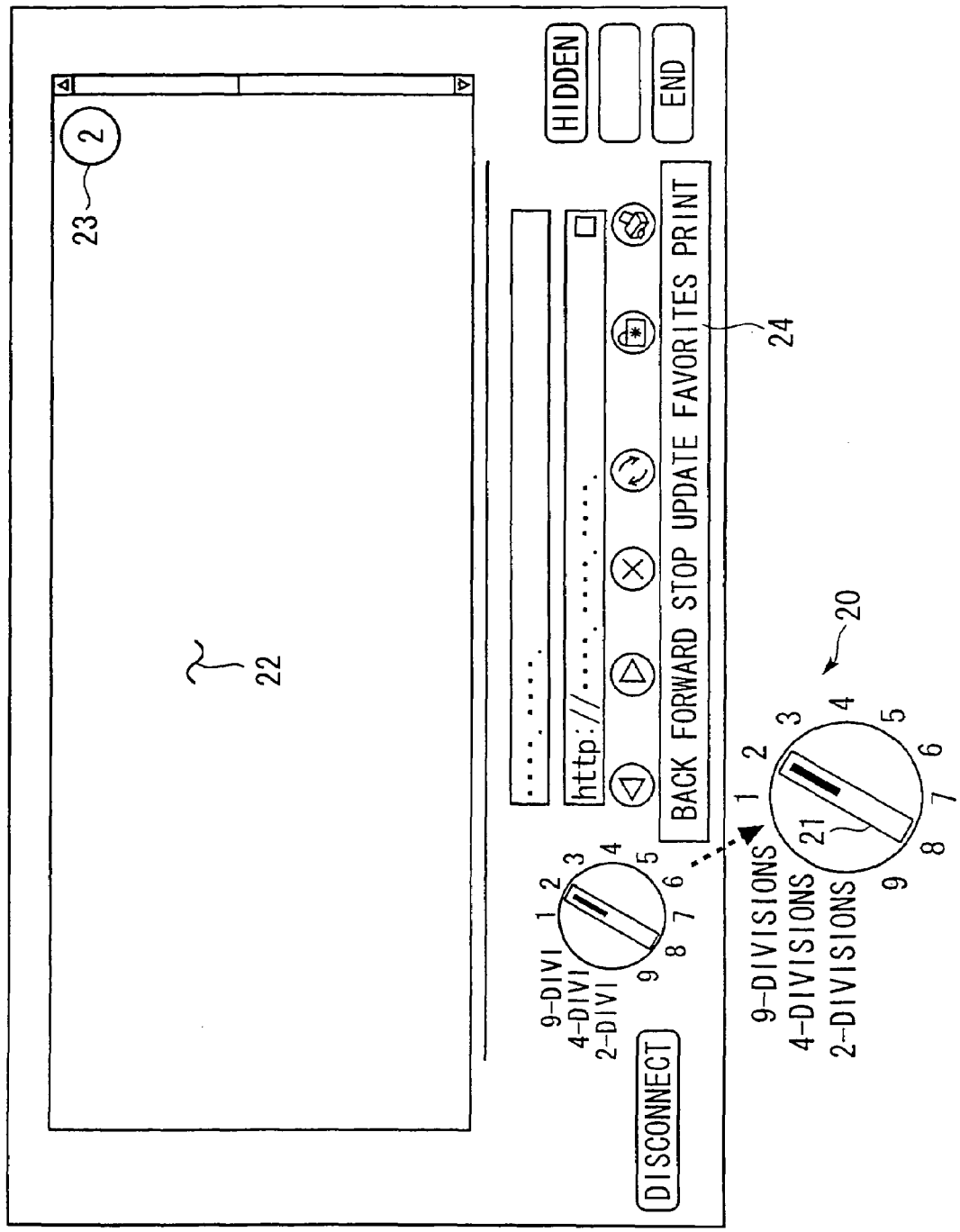
FIG. 4 is a view showing an example of display on a single screen.
Figure 5:
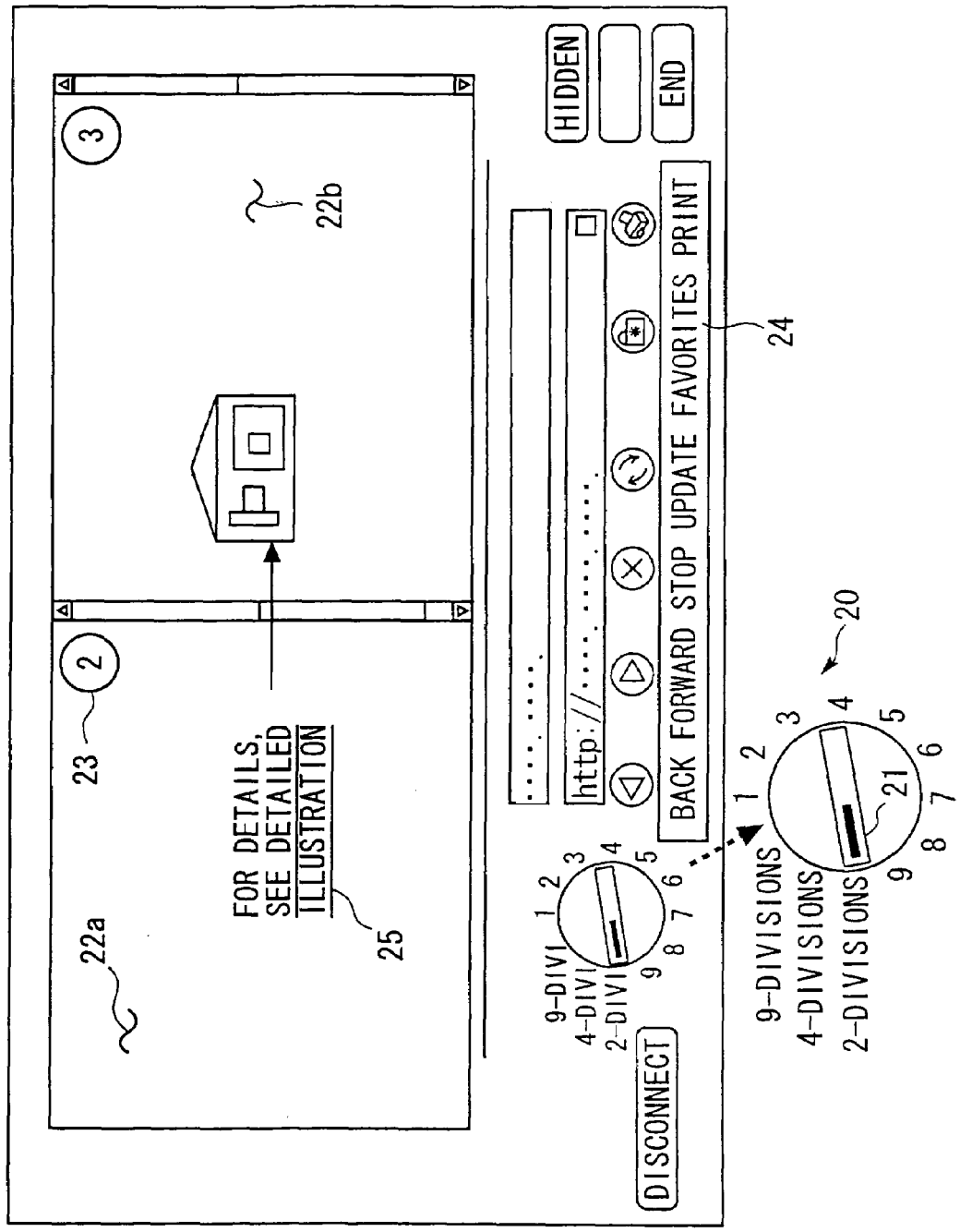
FIG. 5 is a view showing a 2-divided screen.
Figure 6:
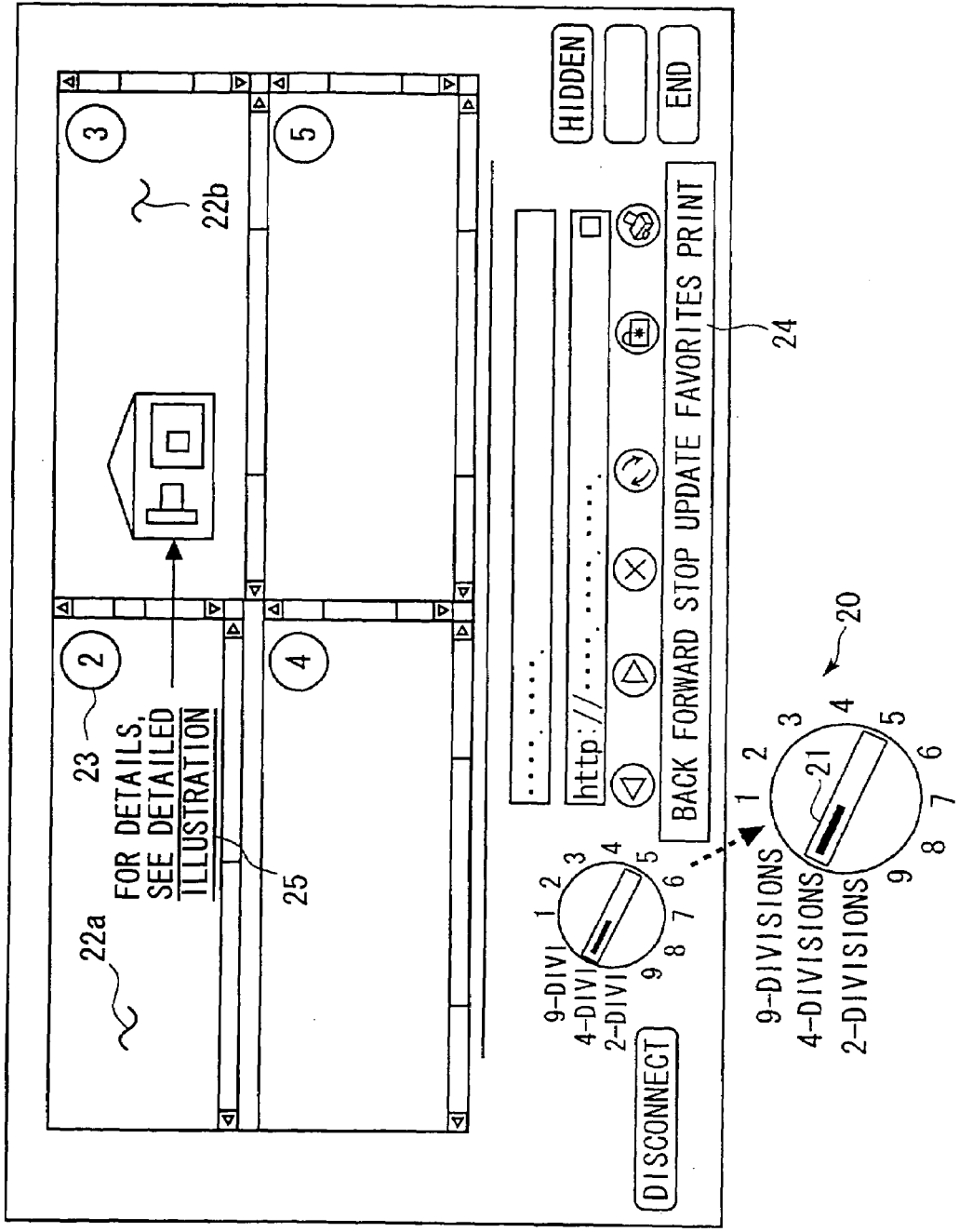
FIG. 6 is a view showing a 4-divided screen.
Figure 7:
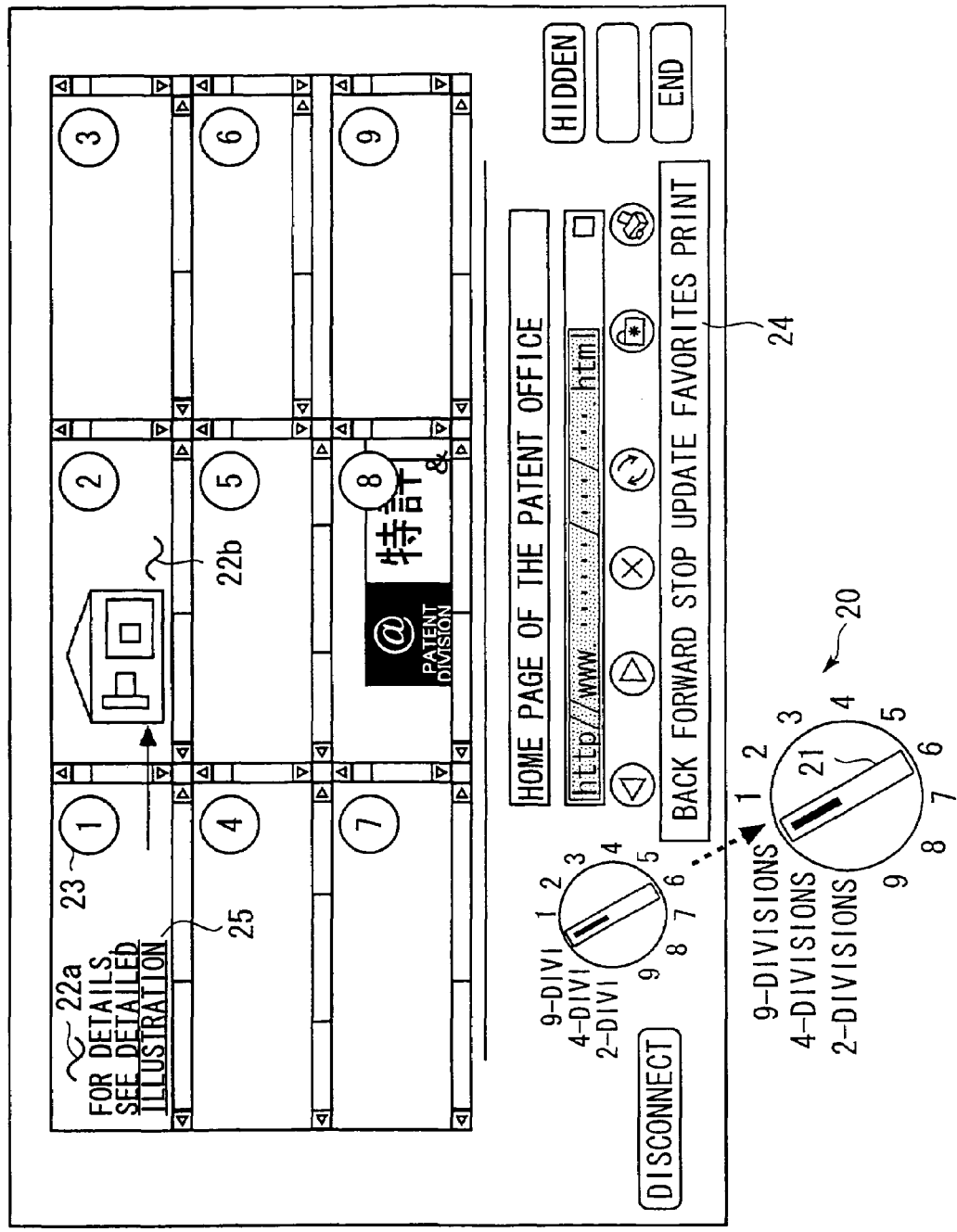
FIG. 7 is a view showing a 9-divided screen.
Figure 9:
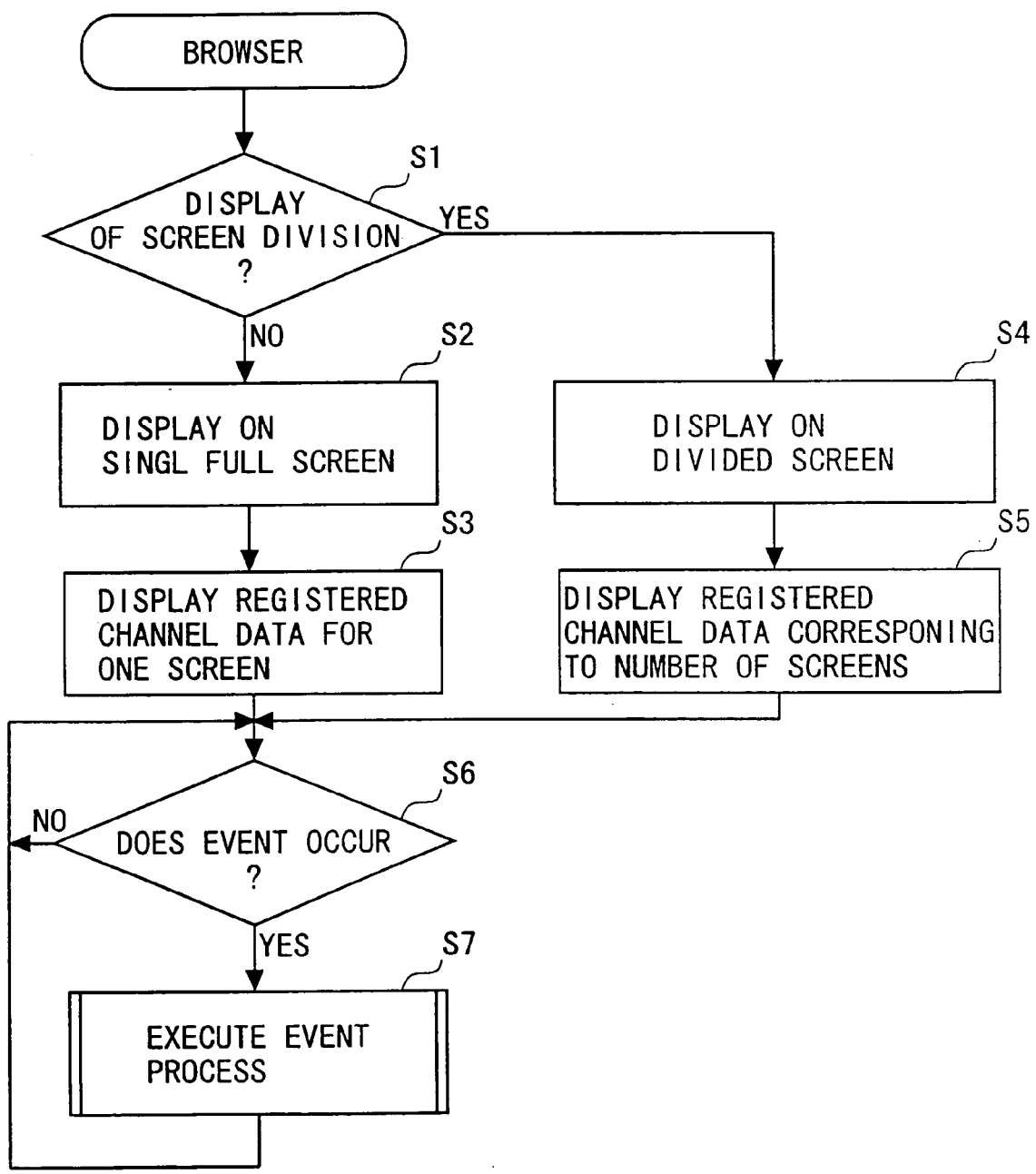
FIG. 9 is a flowchart showing a process of a browser.
Figure 10:
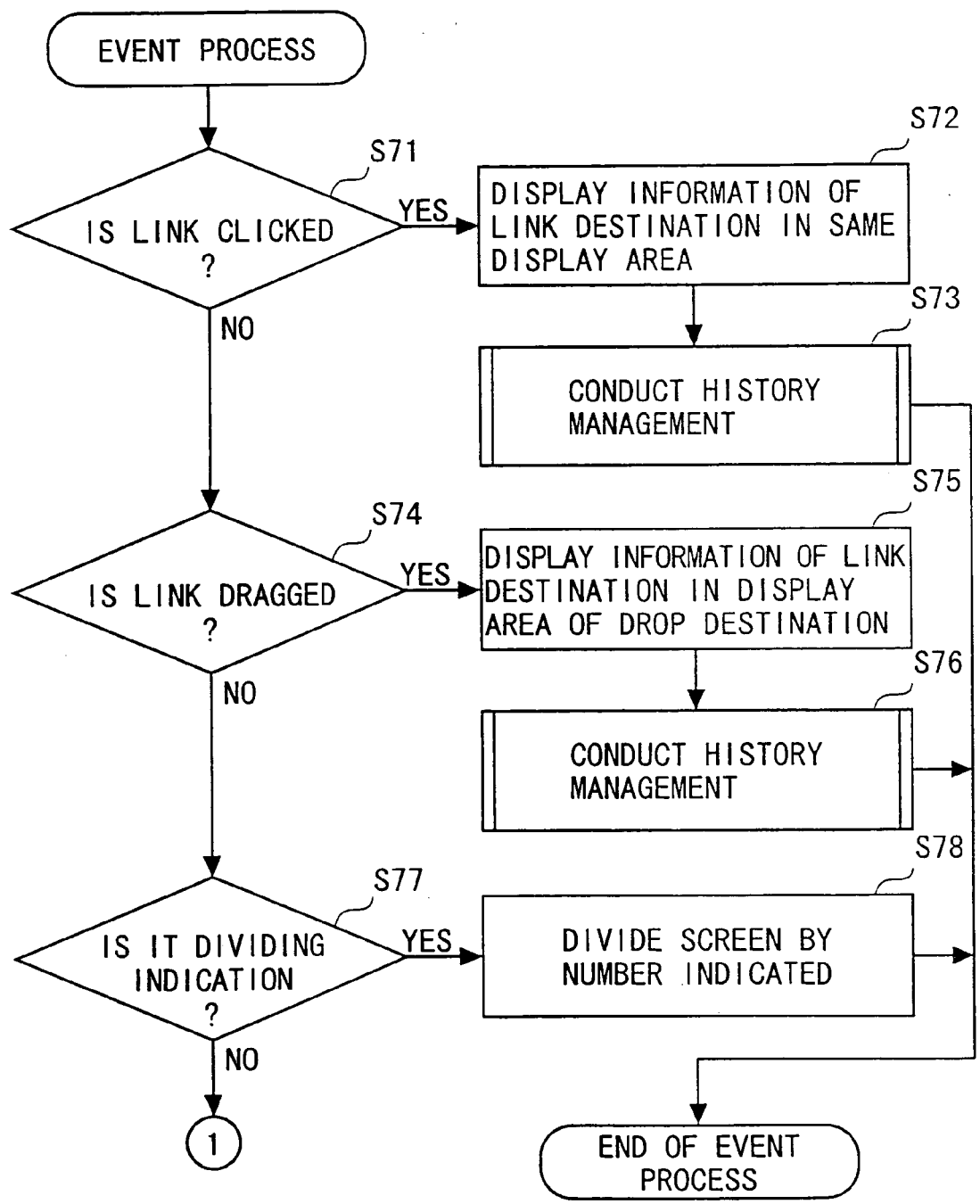
FIG. 10 is a flowchart (1) showing an event process of the browser.
Figure 11:
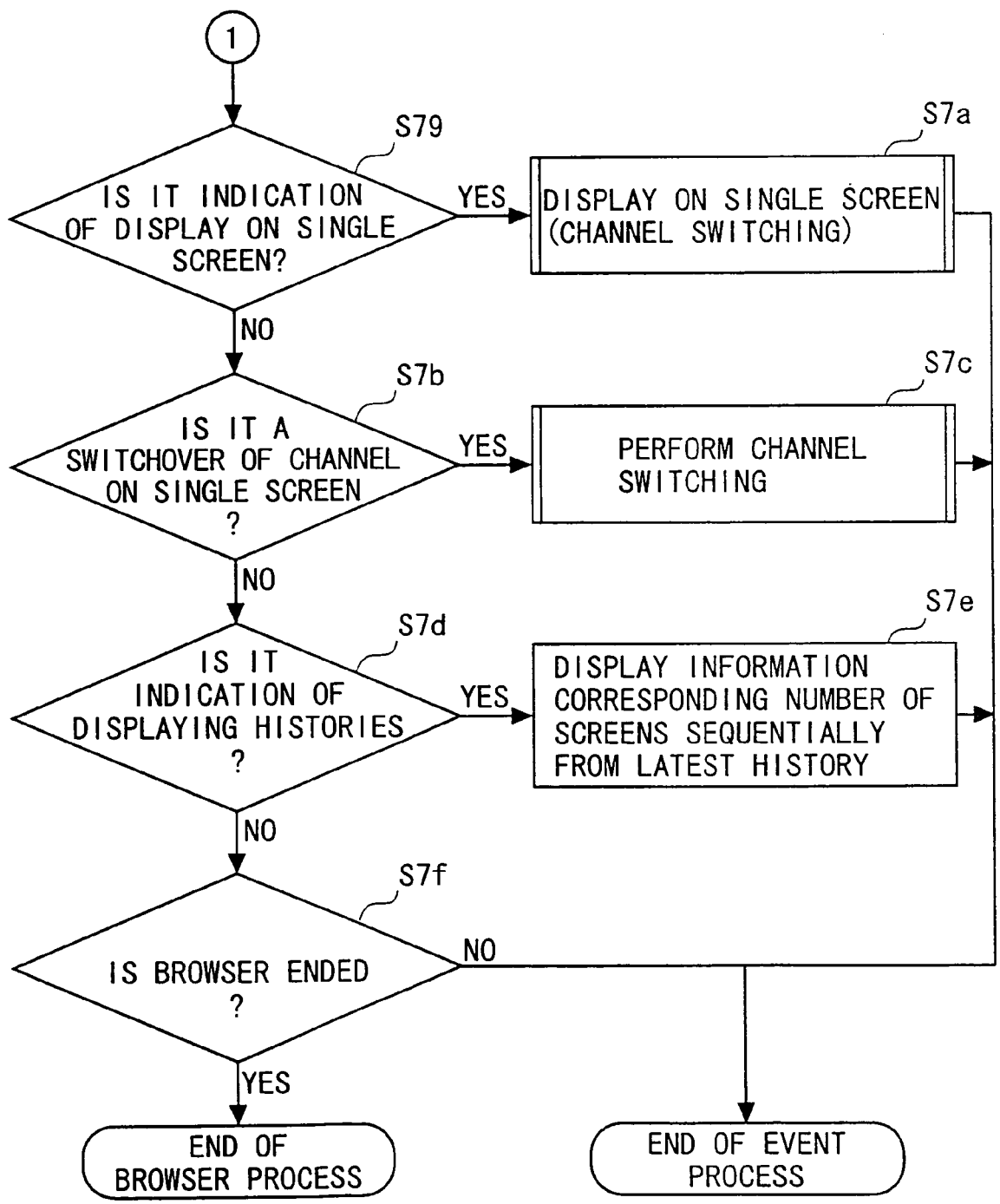
FIG. 11 is a flowchart (2) showing the event process of the browser.
Figure 12:
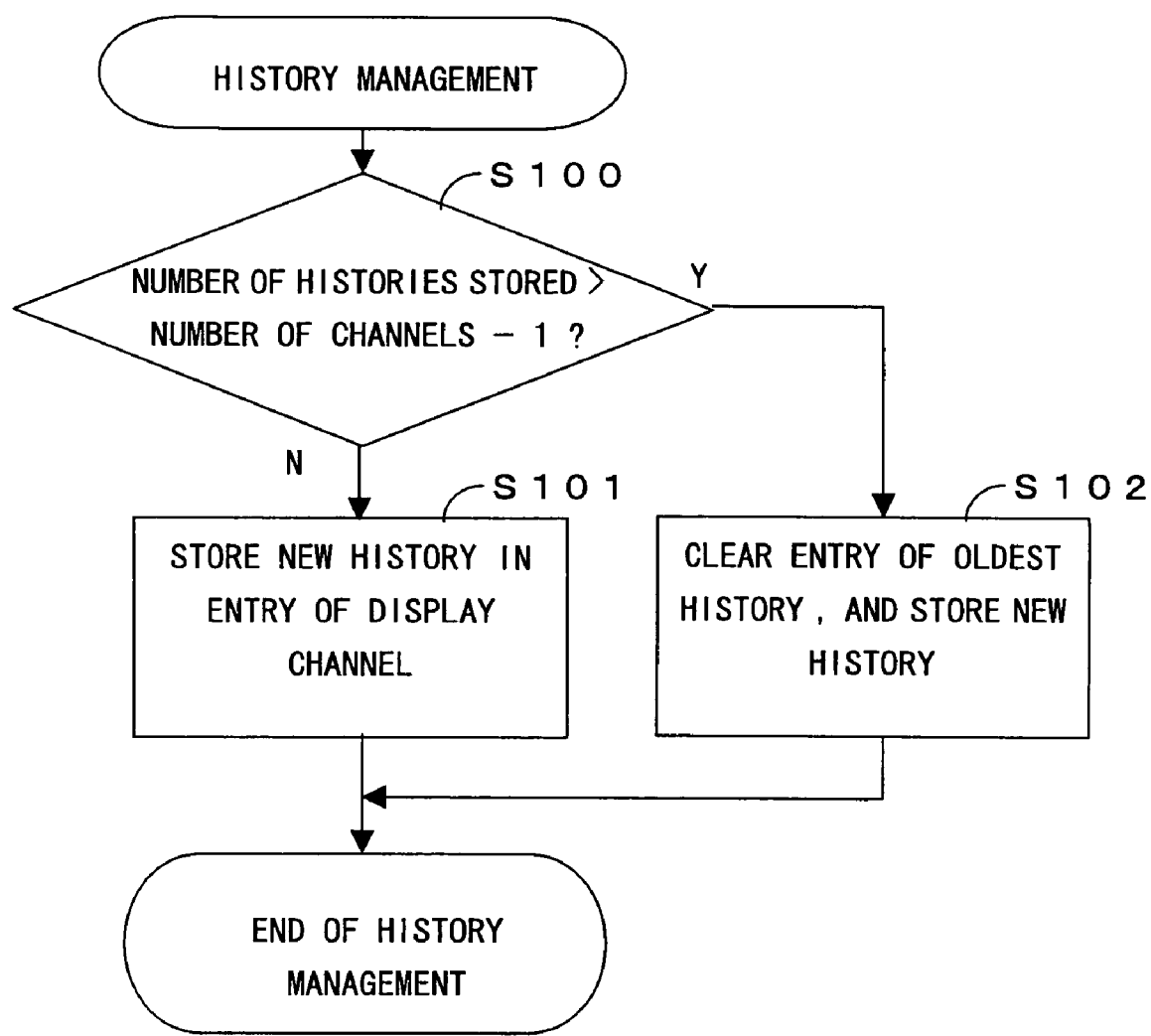
FIG. 12 is a flowchart showing a history management process of the browser.
Figure 13:
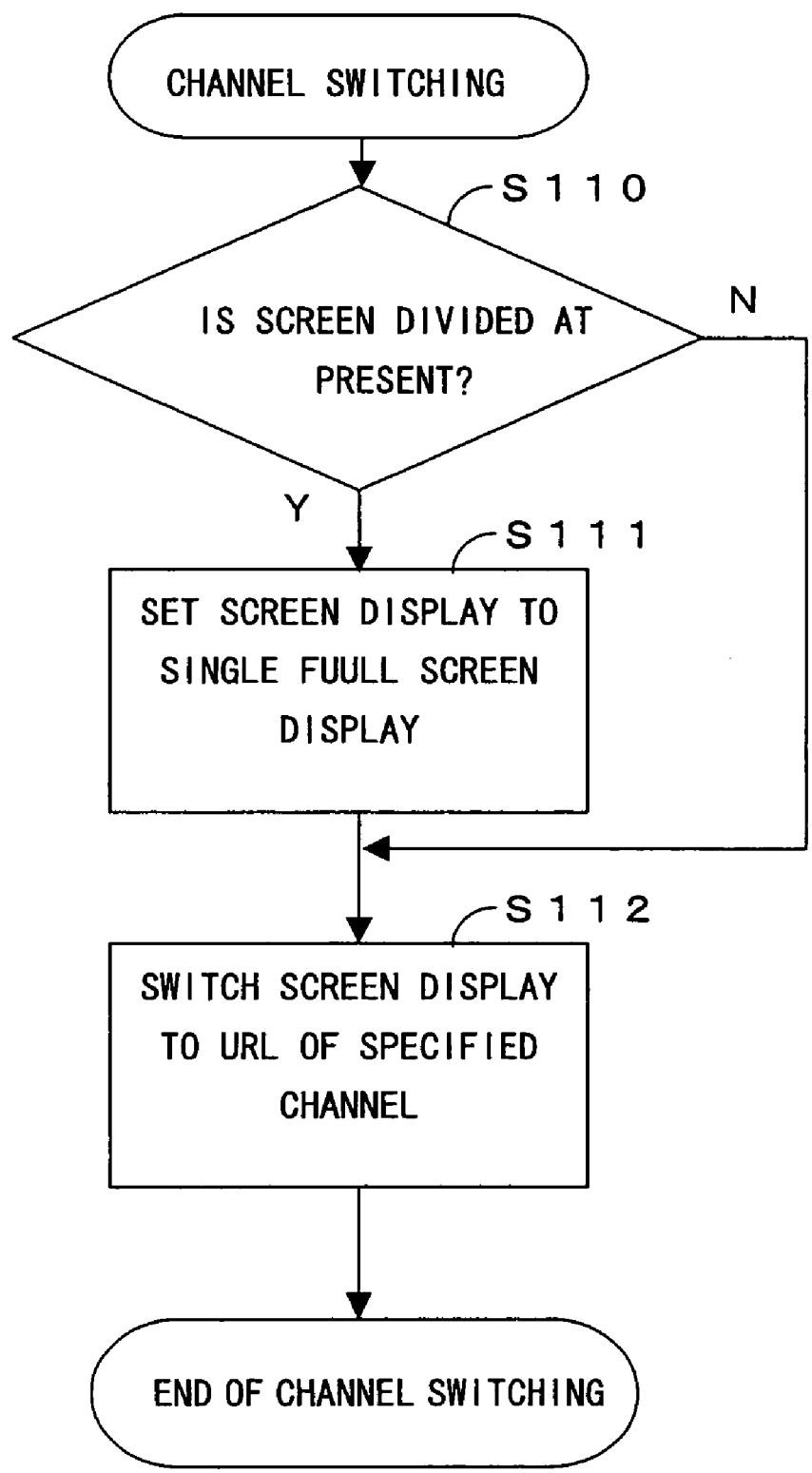
FIG. 13 is a flowchart showing a channel switching process of the browser.
Figure 14:
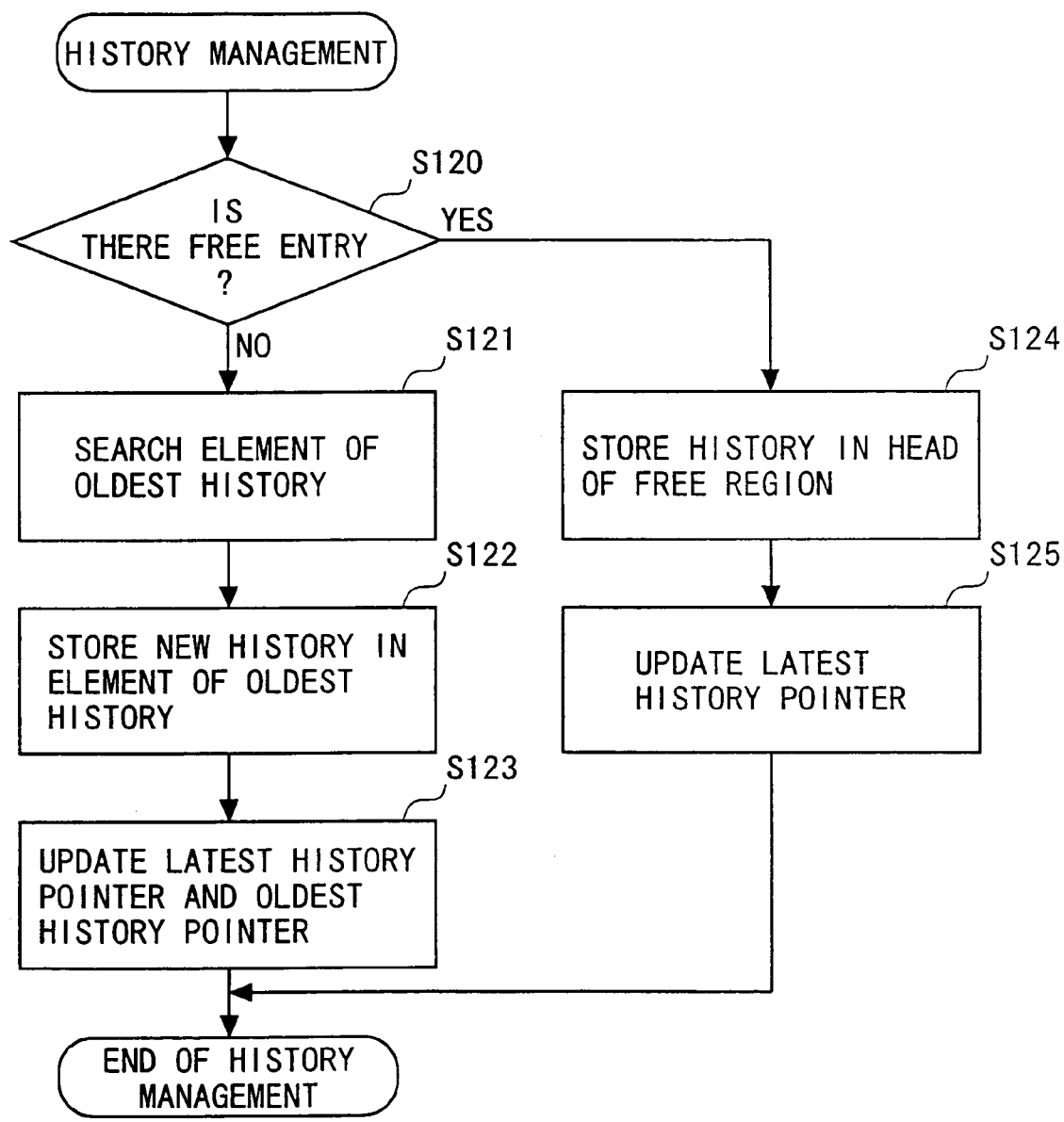
FIG. 14 is a flowchart showing a modified example of the history management process.
Figure 15:
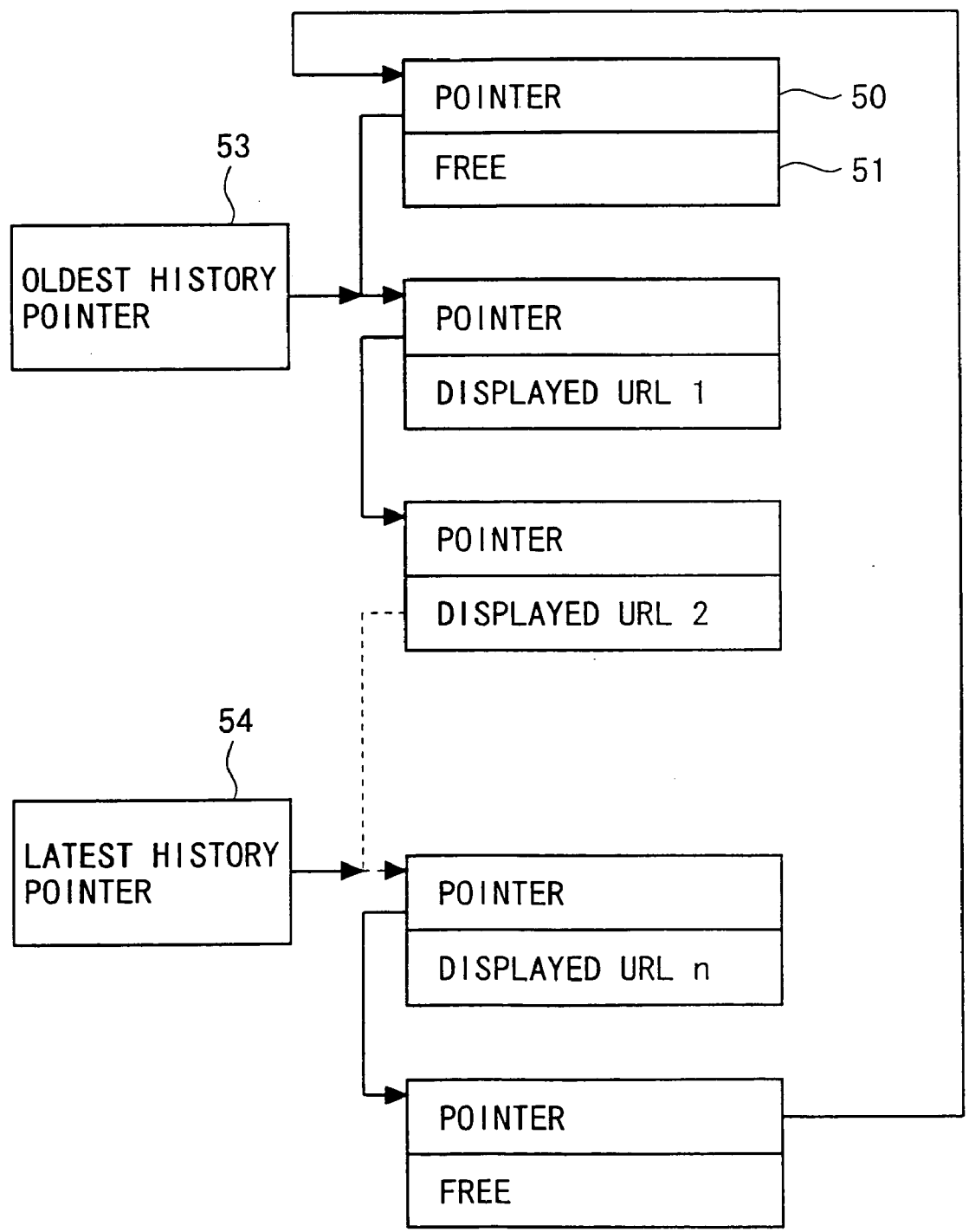
FIG. 15 is a diagram showing a history management list.

FIG. 1 is a view showing an architecture of a network to which the information display system 1 in the first embodiment has an access. FIG. 2 is a view illustrating a hardware architecture of the information display system 1. FIG. 3 is a diagram showing a data structure of a channel table used by the information display system 1. FIG. 4 is a view showing an example of display on a single screen in the information display system 1. FIG. 5 is a view showing a 2-divided screen. FIG. 6 is a view showing a 4-divided screen. FIG. 7 is a view showing a 9-divided screen. FIG. 8 is a diagram showing a data structure of a history management table used by the information display system 1. FIG. 9 is a flowchart showing a process of a browser (a program for browsing the information) executed by a CPU 1 of the information display system 1. FIGS. 10 and 11 are flowcharts each showing an event process of the browser. FIG. 12 is a flowchart showing a history management process of the browser. FIG. 13 is a flowchart showing a channel switching process of the browser. FIG. 14 is a flowchart showing a modified example of the history management process. FIG. 15 is a diagram showing a history management list used in the modified example of the history management process.

<Architecture of Network>

FIG. 1 is a view showing the network to which the information display system 1 has the access. As illustrated in FIG. 1, the information display system 1 is connected to servers 2 through 2n (which will be generically referred to as servers 2) via the network.

The information display system 1 includes a CPU 11 that executes the browser utilizing HTTP (Hypertext Transfer Protocol). The browser functions to establish a connection with the servers 2 in accordance with HTTP. In this state, the browser requests the servers 2 to transmit items of information 3a, 3b, 3c or 3d (which will hereinafter called the information 3a etc) possessed by the servers 2, and displays the information 3a etc transmitted.

Further, the information display system 1 is capable of displaying items of information 3e, 3f locally possessed by the system 1 itself.

The servers 2 has the items of information 3a, 3b, 3c or 3d based on an HTML (Hypertext Markup Language) format. The information in the HTML format retains data known as a link for indicating where related information is stored. Therefore, when the user accesses the information 3a etc via the browser of the information display system 1, the related items of information can be obtained in succession by following the links.

<Hardware Architecture>

FIG. 2 is a diagram showing the hardware architecture of the information display system 1. The information display system 1 includes the CPU 11 for executing the program, a memory 12 for storing the program executed by the CPU 11 and data processed by the CPU 11, a hard disk 13 for recording the program and the data, a CRT 14 for displaying the information to the user, a keyboard 15 used for the user to input the data, a mouse 16 used for the user to manipulate menus and icons on the CRT 14, and a communication interface 17.

The CPU 11 executes the program stored in the memory 12, thereby providing a function as the browser in the information display system 1.

The memory 12 is stored with the program executed by the CPU 11 and the data processed by the CPU 11.

The hard disk 13 records the program executed by the CPU 11 and the data processed by the CPU 11.

The CRT 14 displays the data transmitted from the servers 2 and the data processed by the CPU 11.

The keyboard 15 is used for inputting character data.

The mouse 16 is used for manipulating the menus and icons, and following the links.

The communication interface 17 sends communication data to communication path or receives the communication data from the communication path in response to a command given from the CPU 11.

<Channel>

The present information display system 1, the CPU 11 executing the browser, displays the HTML formatted data stored in the servers 2 on the Internet or stored in its own hard disk 13. The browser identifies, as in the prior art, the display data with the aid of URL (Uniform Resource Locator).

Further, the browser functions to store a plurality of URLs in the form of corresponding to a plurality of channel numbers. The channel number is, as in the case of a TV channel, a number for indicating the information to be displayed.

FIG. 3 shows a structure of the channel table in which the channel numbers and URLs are stored corresponding to each other. This channel table is categorized as a one-dimensional table for retaining URLs in character strings. In the information display system 1 in the first embodiment, the channel table has entries 1 to 9.

The channel table is retained on the memory 12, wherein the entry numbers 1 to 9 correspond to addresses on the memory 12. Namely, the CPU 11, when accessing a given entry, converts an entry number thereof into an address on the memory 12 and accesses its area on the memory 12.

Further, when finishing the present browser, this channel table is stored as a file and used when starting next time.

Moreover, the entry number corresponds directly to channel number. To be more specific, when the information display system 1 is indicated to display items of information identified by the channel numbers 1 to 9, the items of information specified by URLs retained in the entries 1 through 9, are displayed.

<Screen Layout>

FIG. 4 shows an example of display on the screen of the information display system 1 in the first embodiment.

This screen includes a dial object 20 for switching a content of display on the screen, a display area 22 for displaying the information, a channel number display object 23 for identifying the information displayed in the display area 22, and a set of operation buttons 24.

Referring to FIG. 4, the dial object 20 is illustrated in enlargement in a position indicated by a dotted-line arrowhead. The dial object 20 includes character strings (which will hereinafter be referred to as dial characters) for displaying the channel numbers arranged substantially along the circumference and the numbers of divisions, and an indicator 21 rotatable about the center, as a rotary axis, of the circumference.

The numerals 1 to 9 are given as the channel numbers. Further, the character strings for showing 2-divisions, 4-divisions and 9-divisions are given as the numbers of divisions.

The indicator 21 stops in a position that indicates any one of the character strings representing the numbers 1 to 9, the 2-divisions, the 4-divisions and the 9-divisions. When the user clicks any one of the character strings representing the numbers 1 to 9, the 2-divisions, the 4-divisions and the 9-divisions by use of the mouse 16, the indicator 21 moves to the position corresponding to the clicked character string.

Referring again to FIG. 4, the indicator 21 is in the position that indicates the channel number 2. In this case, the information corresponding to the channel number 2 is displayed in the display area 22. An operation mode in which the information corresponding to the single channel is displayed on the one single screen, is called a single full screen display.

The set of operation buttons 24 consist of a "Back" button, a "Forward" button, a "Stop" button, an "Update" button, a "Favorites" button (for displaying registered pages), and a "Print" button. The user indicates to change the display on the screen by clicking the numeral or the character string representing the number of divisions in the dial object 20, or clicking one of the operation buttons 24. When the user clicks, for example, the channel numbers 1 and 3 through 9 one after another in the dial object 20 in the state shown in FIG. 4, the indicator 21 moves as that number is clicked, and the information corresponding to that channel number is displayed in the display area 22.

On the other hand, when the user clocks the link contained in the information displayed in the display area 22, the browser functions to detect URL corresponding to the clicked link. Then, the browser stores the detected URL in the entry of the channel table, which is specified by the channel number (the channel 2 in FIG. 2) displayed in the display area 22. Further, the browser obtains the information located by URL and displays this item of information in the display area 22.

FIG. 5 shows a 2-divided screen. When the user clicks the character string representing the 2-divisions in the dial object 20, the indicator 21 indicates the character string representing the 2-divisions, and the screen of the browser is divided equally by 2 into a display area 22a and a display area 22b. Namely, the thus divided display areas each have the same dimensions in the first embodiment.

The channel number displayed when specifying the 2-divisions is the smallest number among the channel numbers displayed so far before specifying the 2-divisions, and a channel number next thereto. For example, referring to FIG. 4, "2" is indicated as the channel number. In this state, when specifying the 2-divisions, as illustrated in FIG. 5, the items of information corresponding to the channels identified by the channel numbers 2 and 3, are displayed.

FIG. 6 shows a 4-divided screen. When the user clicks the character string representing the 4-divisions in the dial object 20, the indicator indicates the character string showing the 4-divisions, with the result that the browser screen is divided equally into four display areas. When specifying the 4-divisions, the channel number to be displayed is the smallest number among the channel numbers displayed so far before specifying the 4-divisions, and three channel numbers subsequent thereto.

For instance, referring to FIG. 5, the numerals "2" and "3" are shown as channel numbers. When specifying the 4-divisions in this state, the items of information corresponding to the channel numbers 2, 3, 4 and 5 are, as shown in FIG. 6, are displayed.

FIG. 7 shows a 9-divided screen. When the user clicks the character string representing the 9-divisions in the dial object 20, the indicator 21 indicates the 9-divisions, and the browser screen is equally divided into nine display areas. In the information display system 1 in the first embodiment, he channel number is 9, and hence, when specifying the 9-divisions, all the channels 1 through 9 are displayed in the respective display areas as illustrated in FIG. 7. An operation mode of dividing, as shown in FIGS. 5 to 7, the screen into the plurality of display areas 22a etc and displaying the items of information corresponding to the plurality of channels, is called a screen division display.

On the other hand, as shown in FIGS. 5 to 7, when the items of information corresponding the plurality of channels are displayed in the plurality of display areas 22a etc, and when user clicks any one of the channel numbers 1 through 9 in the dial object 20, the indicator 21 turns to a position pointing that clicked number. Then, the information corresponding to the clicked channel number is displayed in the single display area 22 emerging in a way of overlaying other display areas 22a etc.

Further, as shown in FIG. 5 through 7, when the items of information corresponding to the plurality of channels are displayed in the plurality of display areas 22a etc, and when the user clicks double the channel number display object 23 in any one of the display areas 22a etc, the information indicted by the channel number display object 23 is displayed in enlargement in the single display area 22 emerging in a way of overlaying other display areas 22a etc.

Further, when the user clicks the link contained in the information displayed in the display areas 22a etc, the browser detects URL corresponding to the clicked link. Then, the browser changes URL corresponding to the channel number (the channel 2 in FIG. 4) displayed in the display area 22a etc to URL detected. Subsequently, the browser obtains and displays the information located by that URL in the display area 22a etc.

<Drag & Drop for Link>

As discussed above, according to this information display system 1, when clicking the link in each display area 22, the information displayed in that display area 22 is changed to an item of information of a destination of the clicked link.

On the other hand, as shown in FIGS. 5 to 7, in the state of the screen which is divided into the plurality of display areas 22, when the user drags the link displayed in a certain display area 22a and drops it to other display area 22b etc, an item of information of a destination of that link is displayed in the display area 22b where the link has been dropped. The "drag" herein connotes an operation of locating a pointer of the mouse 16 at an operation target and moving the operation target in a desired direction by moving the mouse 16 while depressing the button. Further, the "drop" connotes an operation of releasing the button of the mouse 16 after dragging the operation target, and thus taking off the operation target.

For instance, referring to FIG. 5, it is assumed that the user drags a link 25 (a character string in the see detailed illustration) displayed in the display area 22a that corresponds to the channel number 2 and drops it in the display area 22b corresponding to the channel number 3. At this time, the browser recognizes URL corresponding to the dragged link 25 and the channel number 3 corresponding to the display area 22b where the link 25 has been dropped. The browser changes URL corresponding to the channel number 3 in the channel table to the URL dropped, and further displays the information (detailed drawing) corresponding to that URL in the display area 22b corresponding to the channel number 3.

<History Management>

The browser in this information display system 1 retains a history of user's operations in a history management table. The history of the operations is defined as a list of URLs each locating the information displayed by the user.

FIG. 8 shows a structure of a history management table. The history management table comprises records each consisting of a history number and URL.

The history number represents how much the operation history possessed by that record is old or new. As this history number is smaller, the operation history becomes older. As this history number is larger, the operation history becomes more fresh.

URL locating the information displayed by that operation is recorded in the field of URL.

Each record in the history management table is accessed by an entry number. The entry number is made corresponding to an address of each record on the memory 12.

When the user clicks a desired link in the display area 22 corresponding to a channel number n, the browser displays the information related by this link. At this time the browser records URL locating that item of information in the history management table.

The history is recorded based on a relation with the number of existing histories in the following procedures. More specifically, if the number of existing histories is larger than a channel number n−1, a new history of this time is recorded in an entry recorded with the oldest history among the existing histories.

Whereas if the number of existing histories is smaller than the channel number n−1, the history is recorded in an entry of the channel number n.

The browser of the information display system 1 includes an unillustrated history display button. When the user indicates the browser to display the histories by use of the history display button, the browser refers to the history management table and displays the items of information located by URLs in the history management table, corresponding to the number of the display areas 22 on the screen.

<Function>

FIGS. 9 through 13 show a processing procedure of the browser. The CPU 11 executes the browser, thereby providing a function of the information display system 1.

FIG. 9 shows an outline of the processing of the browser. The CPU 11, when executing the browser, to start with, judges whether a screen division display is specified or not (S1). When the indicator 21 of the dial object 20 indicates any one of the 2-divisions through the 9-divisions, the screen division display is specified. On the other hand, when the indicator 21 indicates anyone of the channels 1 through 9, the single full screen display is specified. Referring to a state of the indicator 21 that is retained in the memory 12, the CPU 11 judges whether the screen division display is indicated or not.

In the case of the screen division display (Yes judgement in S1), the CPU 11 divides the screen in accordance with the number of divisions that is indicated by the indicator 2 (S4). Next, the CPU 11 refers to URLs registered in the channel table from the entry number 1, corresponding to the number by which the screen is divided (S5).

Whereas if judged not to be the screen division display in S1, the CPU 11 displays the single full screen (S2, the whole screen display). Next, the CPU 11 refers to URL having already registered in the entry number 1 in the channel table, and displays the information located by the URL on the single full screen (S3).

Subsequently, the CPU 11 comes to a wait-for-event state (S6). The event connotes generally an external factor (e.g., a detection of user's manipulating the mouse 16) or an internal factor (e.g., an interruption from a timer) for changing a processing state (or a control state of the CPU 11) of the browser. When the event occurs (Yes judgement in S6), the CPU 11 executes an event process (S7).

FIGS. 10 and 11 shows details of the event process. In the event process, the CPU 11 categorizes the event and executes a process corresponding to thereto.

At first, the CPU 11 judges whether a link is clicked or not (S71). When a link is clicked, the CPU 11 displays the information of a link destination on the same display area 22 (S72). Next, the CPU 11 stores URL corresponding to this link in the history management table by conducting history management (S73). Thereafter, the CPU 11 finishes the event process.

Whereas if any link is not clicked (No judgement in S71), the CPU 11 judges whether or not the link is dragged (S74). If the link is dragged, the CPU 11 displays the information of that link destination in a display area where the link has been dropped (S75). Next, the CPU 11 stores URL corresponding to that link in the history management table by conducting history management (S76), and finishes the event process.

If the event is not the dragging of the link, the CPU 11 judges whether the event is the dividing indication or not (S77). The event of the dividing indication occurs when the user clicks the character string representing one of the 2-divisions through 9-divisions in the dial object 20 by use of the mouse 16. If the event is the dividing indication, the CPU 11 divides the screen of the browser, corresponding to the number of divisions (S78). Then, the CPU 11 refers to URLs registered in the channel table by the number of divisions, and displays the information corresponding thereto in the display areas 22. Thereafter, the CPU 11 finishes the event process.

Whereas if the event is not the dividing indication, the CPU 11 judges whether or not the event is an indication of displaying on the single screen (S79). The event of the indication of displaying on the single screen occurs when depressing any one of the channel number display objects 23.

If the event is the indication of displaying on the single screen, the CPU 11 executes a process of displaying on the single screen (S7*a*).

Whereas if the event is not the indication of displaying on the single screen, the CPU 11 judges whether or not the event is a switchover of the channel on the single screen (S7*b*). The event of the channel switchover occurs when depressing a numeral indicating one of the channel number 1 through 9 in the dial object 20.

If the event is the channel switchover on the single screen, the CPU 11 executes a channel switching process (S7*c*).

Note that a common program module is executed both in the process of displaying on the single process and in the channel switchover on the single screen. This will hereinafter simply be termed a channel switching process.

If the event is not the channel switchover, the CPU 11 judges whether or not the event is an indication of displaying the histories (S7*d*). If the event is the indication of displaying the histories, the CPU 11 refers to URLs retained in the history management table sequentially from the latest history, corresponding to the number of divisions of the screen (the number of the display areas 22). Then, the items of information located by the URLs are displayed by the number of screen divisions. (S7*e*).

If the event is not the indication of displaying the history, the CPU 11 judges whether or not the event is an indication of finishing the browser (S7*f*). If the event is the indication of finishing the browser, the CPU 11 finishes the browser. Whereas if the event is not the indication of finishing the browser, the CPU 11 finishes the event process.

FIG. 12 shows details of a history management process (S73 or S76 in FIG. 10). In the history management process, the CPU 11 at first judges whether or not the number of histories stored is larger than the number of channels minus 1 (S100). If the number of histories stored is smaller than the number of channels minus 1, the CPU 11 stores a fresh history (URL and a history number) in an entry of which the number is the same display channel number in the history management table (S101) At this time, a maximum value plus 1 among the existing history numbers is set as a history number.

While on the other hand, if the number of histories stored is larger than the number of channels minus 1, the CPU 11 searches an entry of the oldest (of which the history number is 1) from the history management table. Then, the CPU 11 stores a history (URL and the maximum value among the history numbers) in that entry (S102). Next, the CPU 11 decrements each of the history numbers in other entries by 1 (minus 1).

FIG. 13 shows details of the channel switching process (S7*a* or S7*c* in FIG. 11). In the channel switching process, the CPU 11 at first judges whether or not the browser screen is divided at the present (S110). If the browser screen is divided into a plurality of display areas (Yes judgement in S10), the display mode on the screen is set to the single full screen display (S11).

Next, the CPU 11 switches the screen display to URL of the specified channel (S112). At this time the CPU 112 emits an effective sound of the channel switching. Thereafter, the CPU 11 comes to an end of processing.

As discussed above, in the information display system in the first embodiment, the browser screen is divided into the plurality of display areas, and the items of information (home pages in World Wide Web) corresponding to URLs different from each other, can be displayed in the respective display areas. Therefore, this information display system 1 is convenient for comparing two items of information, e.g., information on commercial articles on the Internet by arranging them.

Further, a consumption of resources can be more restrained than by executing the plurality of browsers, and besides the areas (display areas) used for displaying the menus can be reduced.

Moreover, it is feasible to decrease the time needed for starting a new browser and for specifying the information that the user wishes to browse, and to save the labor for the operation.

Further, according to the information display system 1, the user drags and drops the link displayed in one display area to other display area, whereby the information of the link destination can be displayed in the display area where the link has been dropped while keeping the information in the previous display area. Accordingly, the user is, when searching plural items of related information by following the links, able to browse the related information by displaying batchwise these items of related information on the same screen.

Furthermore, the present information display system 1 is capable of retaining the user's operation history and displaying batchwise the information displayed in the past, in the plurality of display areas. The user is, when searching the plural items of related information by following the links, therefore able to the labor for getting back to the information displayed in the past. Moreover, in this case, the histories are displayed as ordinary information in the display areas 22, and hence the user is able to easily search the necessary items of information from the operation histories in the past and display these items of information.

MODIFIED EXAMPLE

In the first embodiment, the entry in the history management table is determined based on the relation between the number of stored histories and the number of channels. Then it is stored in the history management. The embodiment of the present invention is not, however, limited to this procedure of the history management.

FIG. 14 shows a modified example of the history management. In this example, a history management list shown in FIG. 15 is used as a substitute for the history management table in FIG. 8.

The history management list in FIG. 15 has a list structure in which a plurality of elements are linked by pointers 50. Each element consists of the pointer 50 and a region 51 for storing URL. The pointers link the elements retaining URLs in the order of being displayed. Therefore, the history management list is capable of retaining the order in which to display the information.

On the other hand, the region 51 is stored with URL that locates the displayed information. As a result, the history management list is capable of retaining URLs for the displayed information in the information-displayed order.

Further, the element retaining the oldest history in the history management list is pointed by an oldest history pointer 53. Further, the element retaining the latest history in the history management list is pointed by a latest history pointer 54. Therefore, the elements, which retain the oldest and latest histories in the history management list, are explicated.

The elements starting from the element pointed by the oldest history pointer 53 up to the element pointed by the latest history pointer 54, are those having the stored histories. On the other hand, the region from the element next to the element pointed by the latest history pointer 54 to the element before the element pointed by the oldest history pointer 53 is a free region. Thus, in the history management list, the elements for retaining the stored histories and the free region are linked in a ring-like configuration.

FIG. 14 shows a history management procedure based on this history management list. To begin with, the CPU 11 judges whether or not the history management list contains the free region (S120) The free region corresponds to a region from the element next to the element pointed by the latest history pointer 54 to the element before the element pointed by the oldest history pointer 53.

If there is no free region, the CPU 11 searches the element that retains the oldest history from the oldest history pointer 53 (S121).

Next, the CPU 11 stores a new history (URL locating the information displayed this time) in the oldest history element (S122).

Subsequently, the CPU 11 points the element stored with the new history by the latest history pointer 54. Further, the CPU 11 advances the element pointed by the oldest history pointer 53 ahead by one element in a new direction (S123). Thereafter, the history management comes to an end.

Whereas if judging in S120 that there is a free entry, the CPU 11 stores the history (URL locating the information displayed) in the head element of the free region (S124). Herein, the head element of the free region is defined as the element next to the element pointed by the latest history pointer 54. The head element of the free region can be searched by following the element pointed by the latest history pointer 54.

Next, the CPU 11 updates the latest history pointer 54 so as to point the element stored with this history (S125). Thereafter, the history management is finished.

According to the modified example, if it is judged in S120 that there is no free entry, the element of the oldest history is stored with the new history. Instead, if there is no free entry, an element may be ensured fresh on the memory 12.

The embodiment discussed above has exemplified the case where the screen is divided by 1, 2, 4 and 9. The embodiment of the present invention is not, however, limited to these numbers of screen divisions.

The embodiment discussed above has exemplified the case in which the number of channels is set to 9. The embodiment of the present invention is not, however, confined to this number of channels.

The embodiment discussed above has exemplified the case in which the mouse 16 is used for dragging and dropping the operation target. The embodiment of the present invention is not, however, restricted to such construction. Other pointing device, e.g., a touch panel may also be used in place of the mouse 16.

<Readable-by-Computer Recording Medium>

The program exemplified in this embodiment may be recorded on a readable-by-computer recording medium. Then, a computer reads the program from this recording medium and executes it, whereby the computer can function as the information display system 1 demonstrated in the first embodiment.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the above program may be stored in the hard disk and the memory of the computer, and downloaded to other computers via communication media. In this case, the program is transmitted as data communication signals embodied in carrier waves via the communication media. Then, the computer downloaded with this program can be made to function as the information display system in this embodiment.

Herein, the communication medium may be any one of cable communication mediums (such as metallic cables including a coaxial cable and a twisted pair cable, or an optical communication cable), and wireless communication media (such as satellite communications, ground wave wireless communications, etc.).

Further, the carrier waves are electromagnetic waves for modulating the data communication signals, or the light. The carrier waves may, however, be DC signals (in this case, the data communication signal takes a base band waveform with no carrier wave. Accordingly, the data communication signal embodied in the carrier wave may be anyone of a modulated broadband signal and an unmodulated base band signal (which corresponds to a case where a DC signal having a voltage of 0 is set as a carrier wave).

<<Second Embodiment>>

Figure 16:
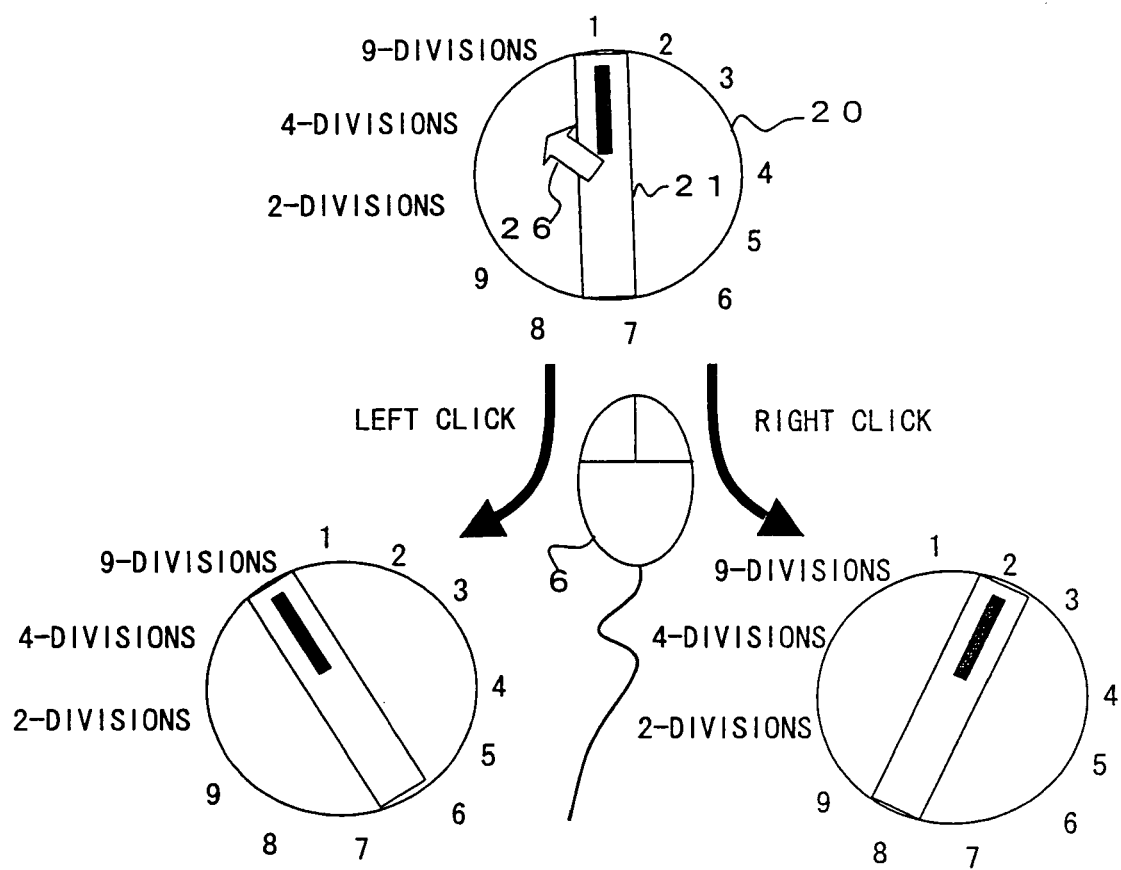
FIG. 16 is an explanatory diagram showing operations effected on the dial object 20.
Figure 17:
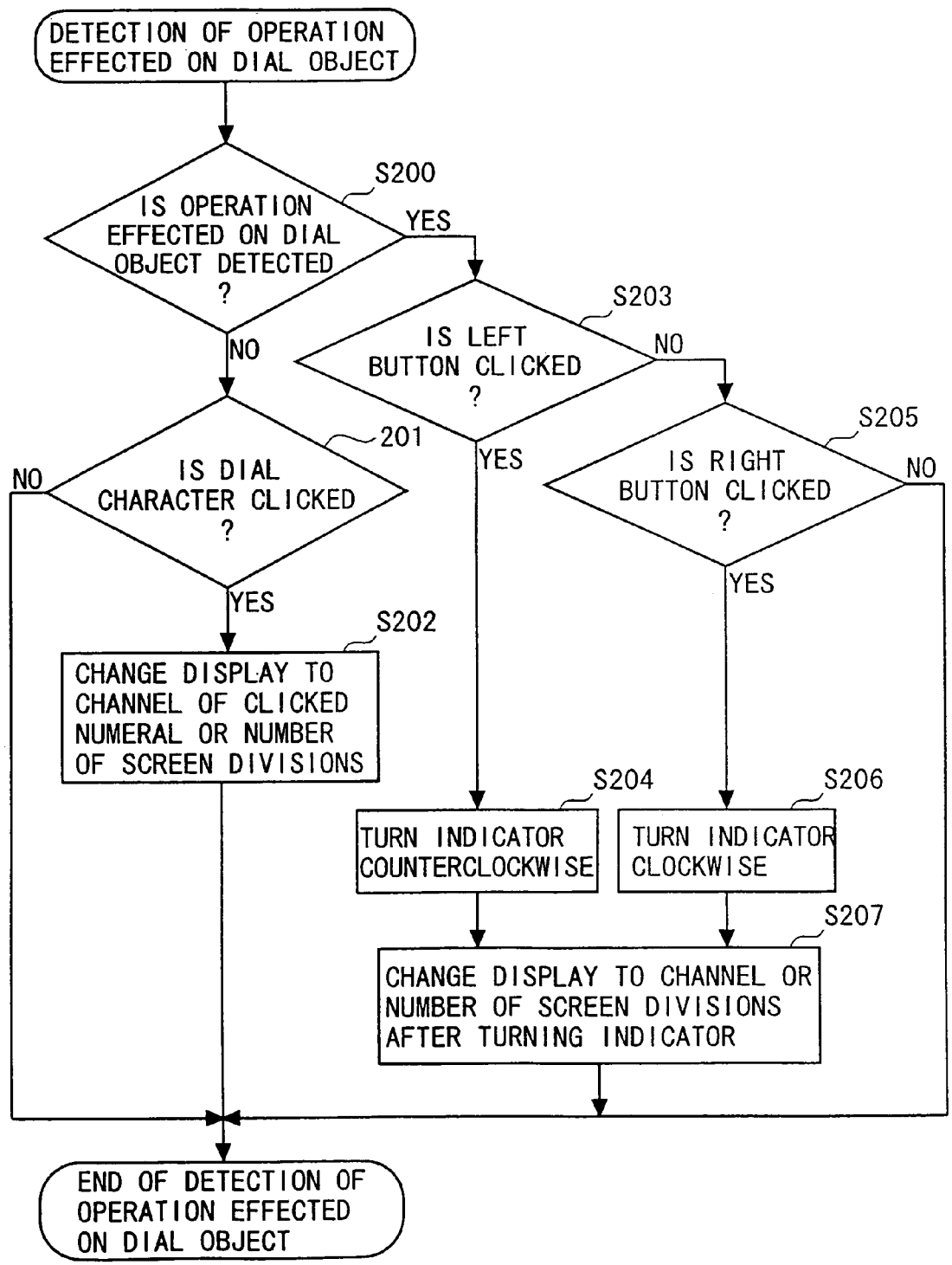
FIG. 17 is a flowchart showing a process of detecting the operation effected on the dial object 20.

FIGS. 16 and 17 show processes by the information display system 1 in a second embodiment of the present invention.

FIG. 16 is an explanatory diagram showing operations effected on the dial object 20 displayed on the CRT 14 of the information display system 1 in accordance with the second embodiment. FIG. 17 is a flowchart showing a process of detecting the operation effected on this dial object 20.

The first embodiment has exemplified the information display system 1 constructed such that the channel table is stored with the plurality of URLS, and the information displayed in one or the plurality of display areas. The channel is switched over by clicking one of the numerals or the character string representing one of the 2- through 9-divisions in the dial object 20.

There will be explained the information display system 1 in the second embodiment, wherein the indicator 21 in the dial object 20 is turned by manipulating left and right buttons of the mouse 16, and the information displayed in the display area is thus switched. The information display system 1 in the second embodiment is substantially the same as the information display system 1 in the first embodiment, except for the operations of the dial object 20. Accordingly, the same components are marked with the same numerals as those in the first embodiment, of which the repetitive explanations are omitted. Further, the discussion might need the reference to the drawings in FIGS. 1 through 15 as the necessity arises.

<Operation of Dial Object 20>

FIG. 16 shows operation of the dial object 20 displayed on the CRT 14.

Referring to FIG. 16, the indicator 21 in the dial object 20 indicates the channel number 1. Further, a pointer 26 of the mouse 16 is set on the dial object 20, and the dial object 20 is in an operable state (which will hereinafter be called a focused state). In this focused state, when the user depresses the left button of the mouse 16 (this is called a left click), the indicator 21 turns counterclockwise by one step. Herein, "one step" implies an angle through which the indicator 21 moves by one element of the dial characters.

Further, in the state where the dial object 20 is focused by the pointer 26, when the user depresses the right button of the mouse 16 (which is termed a right click), the indicator 21 turns clockwise by one step.

Note that when the dial character of the dial object 20 is clicked, the indicator 21 indicates this clicked character (the numeral or the character string). Then, when the indicator 21 of the dial object 20 turns, the display on the browser screen changes as done in the first embodiment.

<Function and Effect>

FIG. 17 shows the process of detecting the operation with respect to the dial object 20. When an operation event with respect to the dial object 20 occurs, the CPU 11 executes the process shown in FIG. 17.

To begin with, the CPU 11 judges whether or not the operation is effected on the dial object 20 (S200). If judged not to be the operation on the dial object 20, the CPU 11 judges whether or not the dial character is clicked (S201).

When the dial character is clicked, the indicator 21 is moved to a position of this clicked dial character (the numeral or the character string representing one of the 2- through 9-divisions). Further, the CPU 11 changes the display on the browser screen to the channel indicated or the number of divisions indicated (S202).

While on the other hand, if it is judged in S201 that the dial character is not clicked, the CPU 11 executes nothing and finishes the process of detecting the operation on the dial object 20.

In the judgement in S200, when detecting the operation on the dial object 20, the CPU 11 next judges whether or not the dial character is clicked by the left button (S203). If clicked by the left button, the CPU 11 turns counterclockwise the indicator 21 of the dial object 20 by one step (S204).

Next, the CPU 11 changes the display for the channel or the number of screen divisions after the indicator has turned (S207), and finishes the process of detecting the operation on the dial object 20.

Whereas if not clicked by the left button in the judgement in S203, the CPU 11 judges whether or not the dial character is clicked by the right button (S205). If clicked by the right button, the CPU 11 turns clockwise the indicator 21 of the dial object 20 by one step (S206).

Next, the CPU 11 changes the display for the channel or the number of screen divisions after the indicator has turned (S207), and finishes the process of detecting the operation on the dial object 20.

If not clicked by the right button in the judgement in S205, the CPU 11 executes nothing and finishes the process of detecting the operation on the dial object 20.

As discussed above, according to the information display system 1 in the second embodiment, the user turns the indicator 21 of the dial object 20 by manipulating the mouse 16 and is thus able to change the display on the browser. The user is therefore able to change over the display on the browser as simply as manipulating a TV channel.

Further, the display on the browser can be switched over by such a simple operation as setting a position of the mouse cursor on the dial object 20 and performing the left or right click, with the result that the trouble some operations become unnecessary.

MODIFIED EXAMPLE

In the embodiment discussed above, the dial object 20 is, as shown in FIG. 16, constructed of the numerals and the character strings (the dial characters) representing the number of divisions, which are arranged along the circumference, and the indicator 21 turning about the center of the circumference. The embodiment of the present invention is not, however, limited to the configuration itself of the dial object 20 described above. For example, the dial object 20 may also take such a configuration that the object 20 does not include the indicator 21, and an indicated position is shown by reversing the numeral or the character string representing the number of divisions in a black-and-white mode. The indicator 21 may be formed in an annular shape or may include a projection for indicating a predetermined position.

<<Third Embodiment>>

Figure 18:
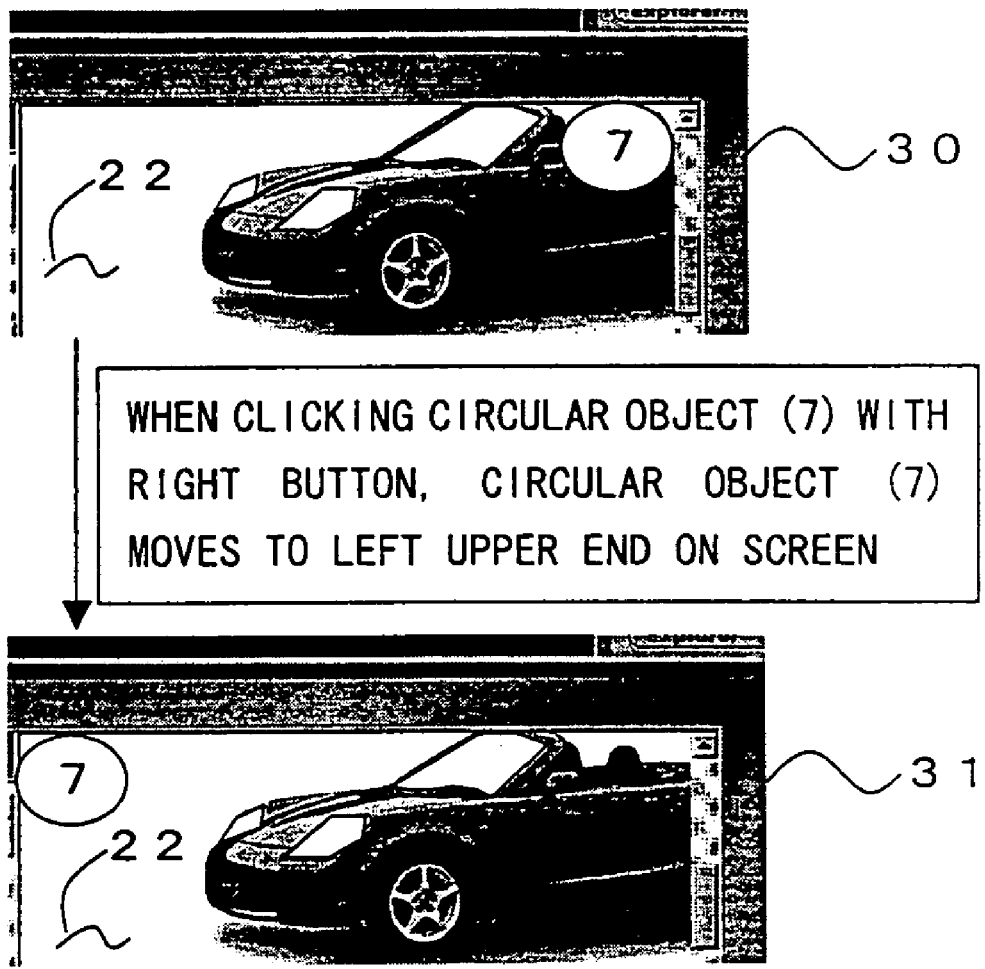
FIG. 18 is an explanatory view showing the operation of moving the object.
Figure 19:
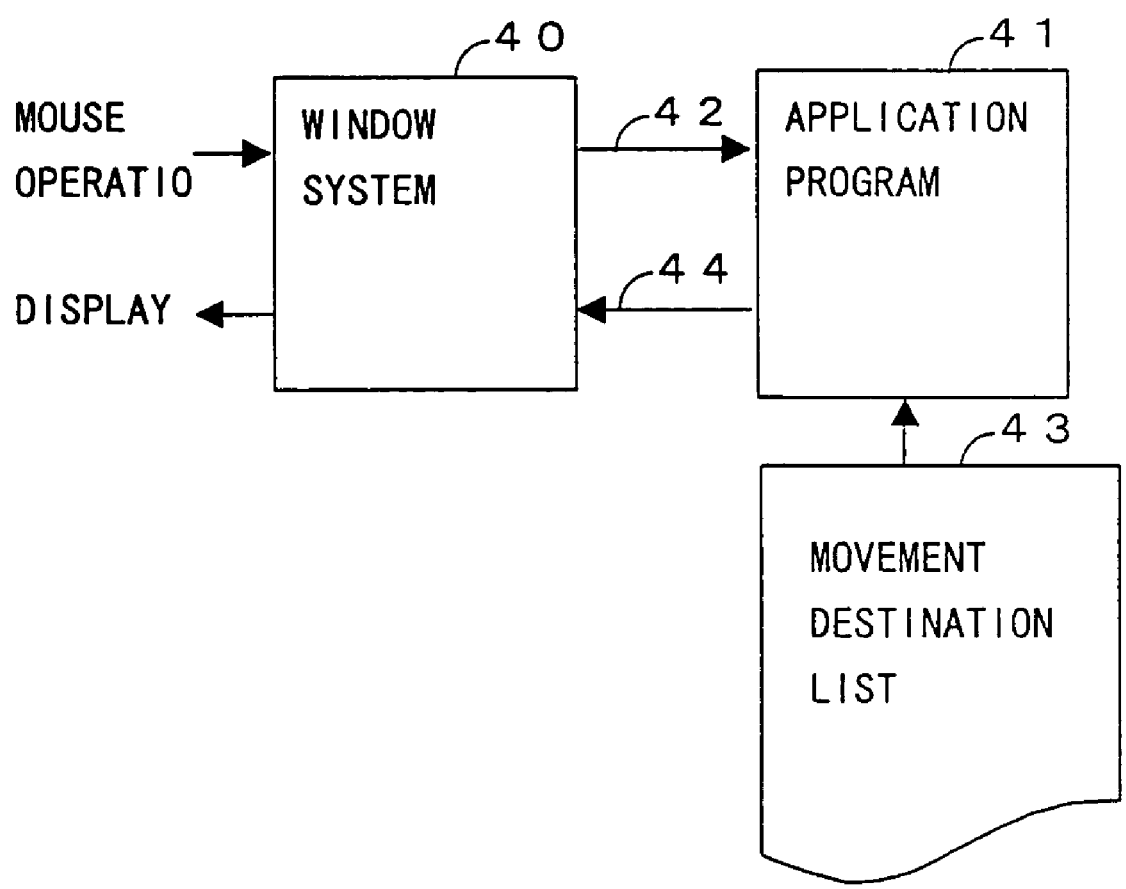
FIG. 19 is a diagram showing a structure of a program in a third embodiment.
Figure 21:
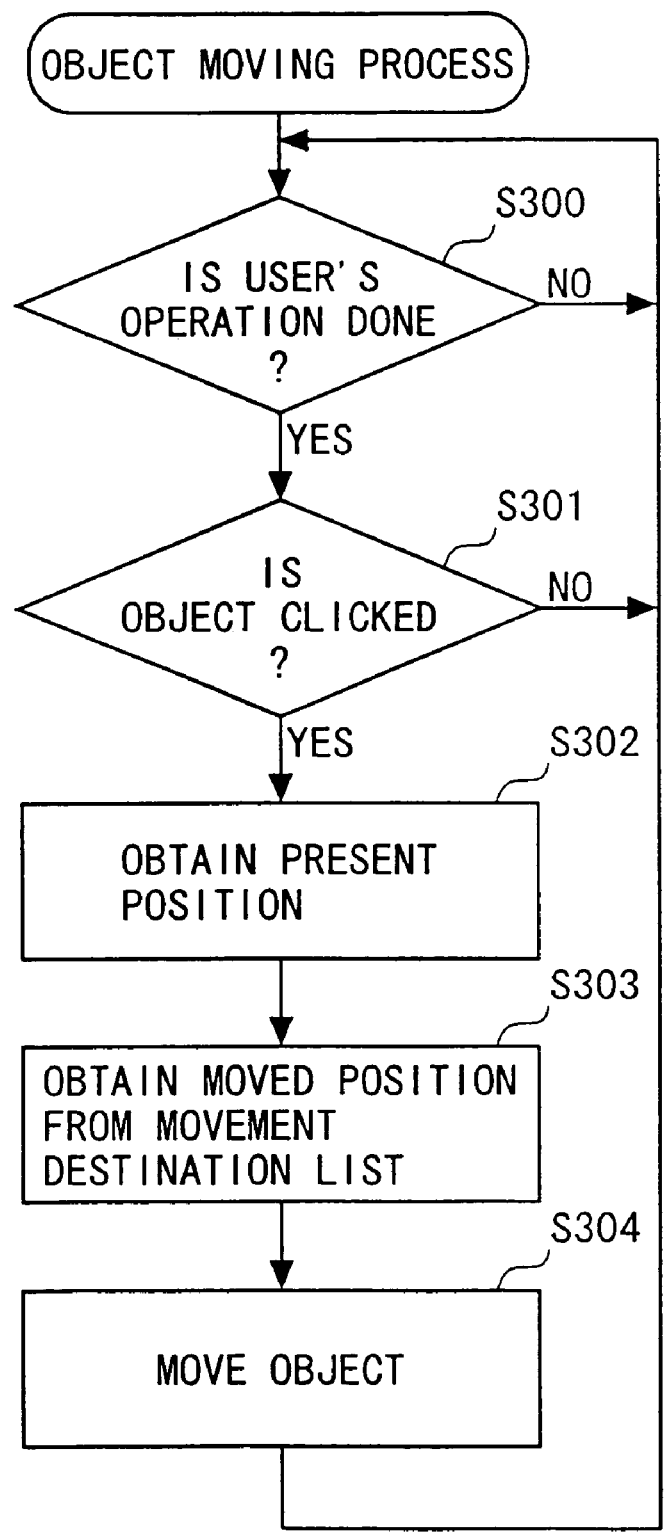
FIG. 21 is a flowchart showing steps of the object moving process.
Figure 22:
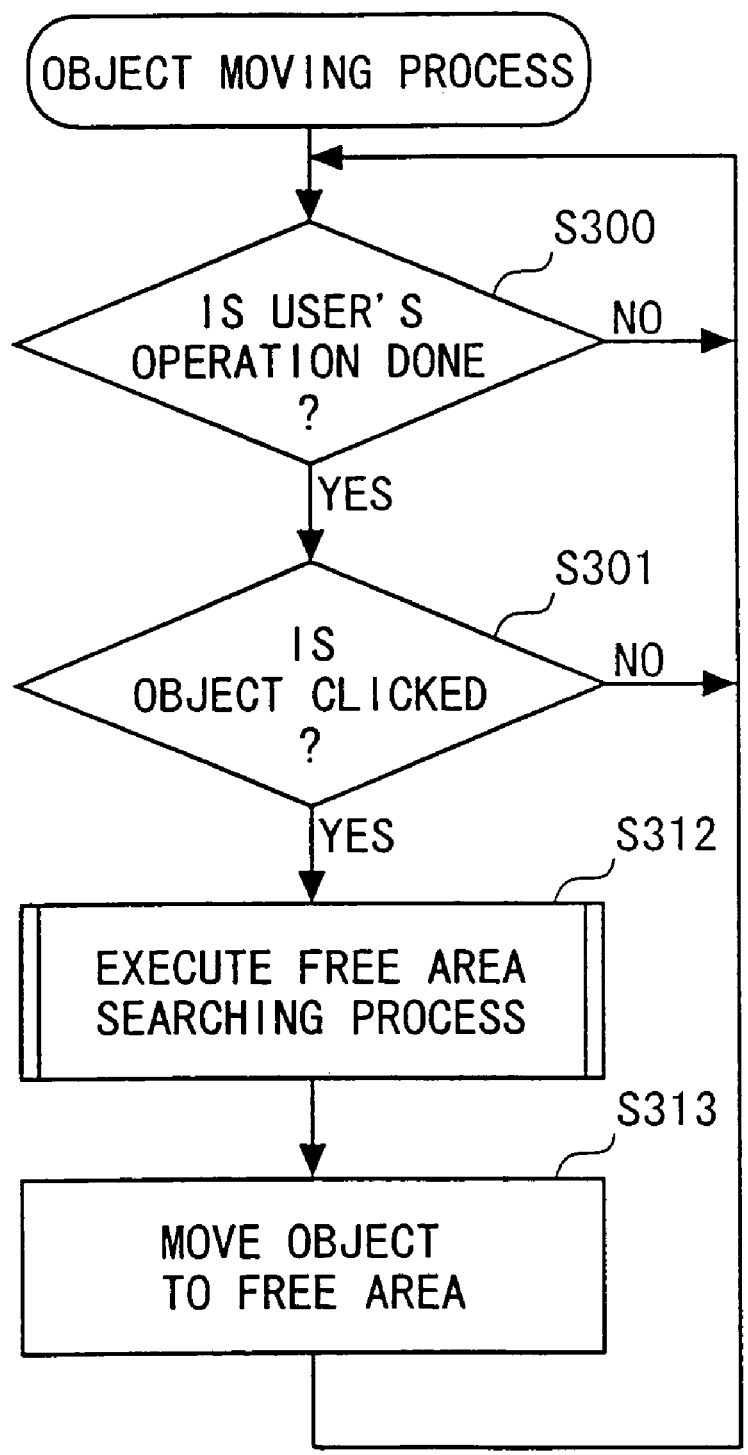
FIG. 22 is a flowchart showing steps of the object moving process in a modified example 1 thereof.
Figure 23:
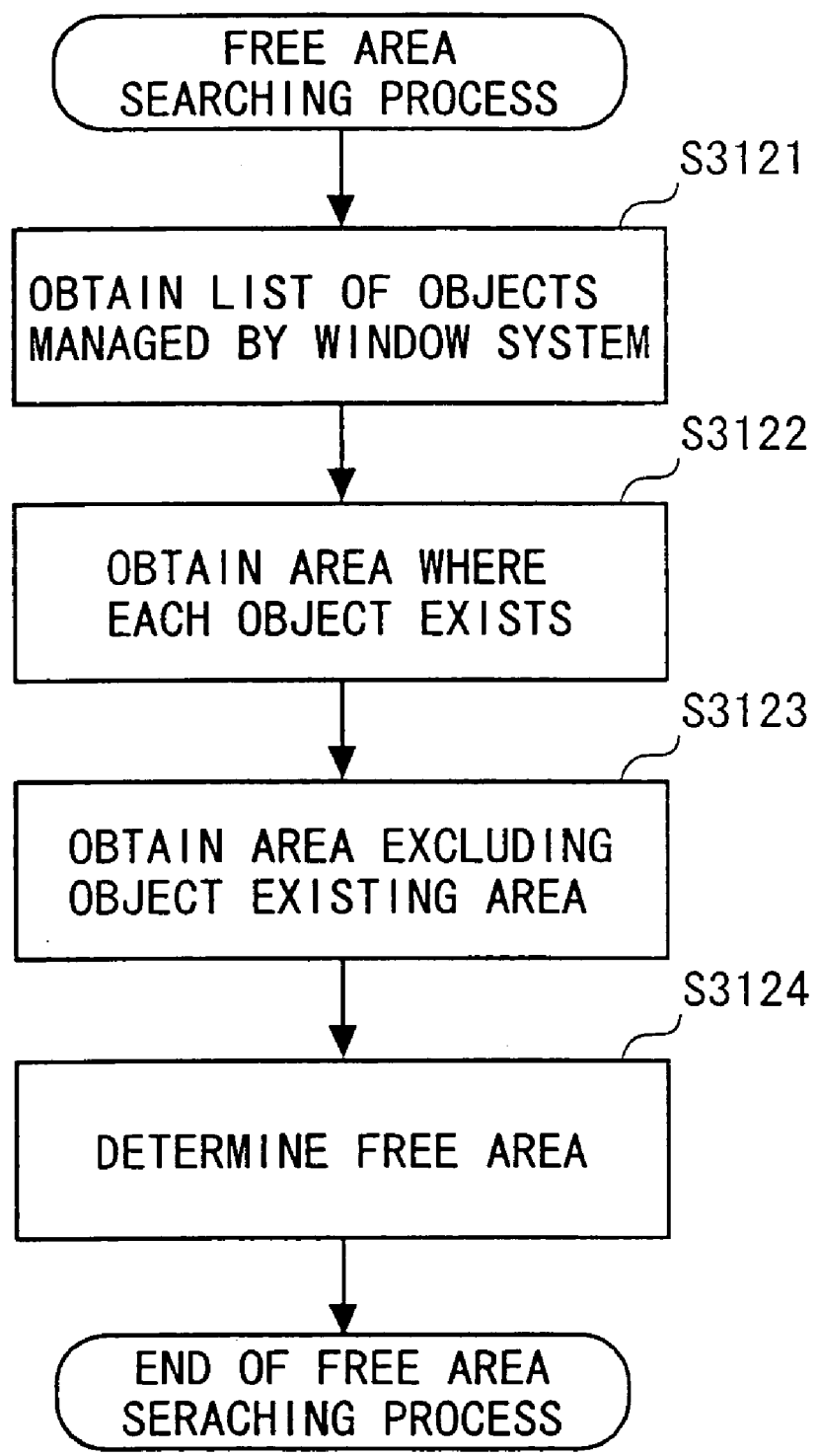
FIG. 23 is a flowchart showing a free region searching process.
Figure 24:
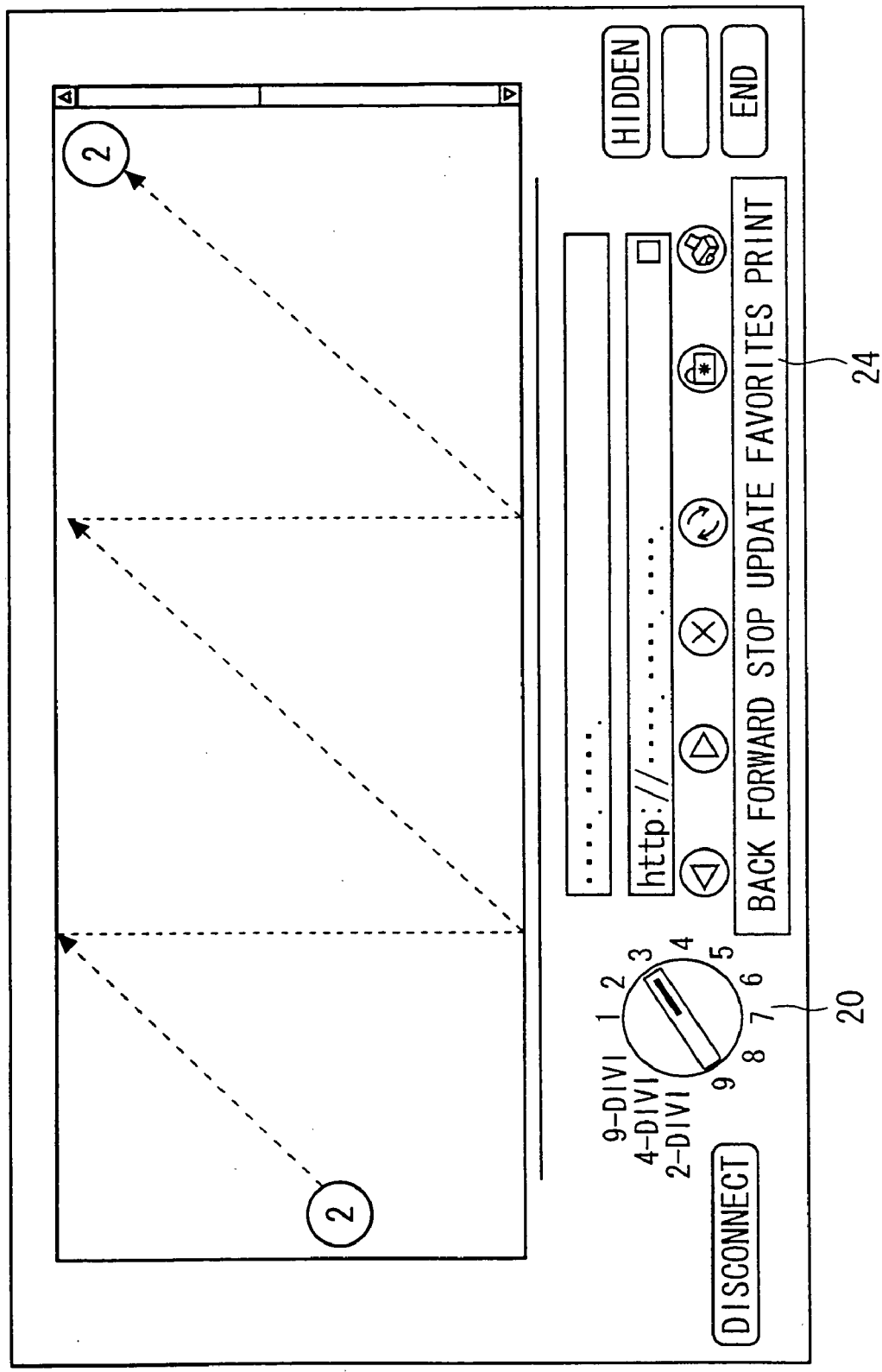
FIG. 24 is an explanatory view showing how the object is moved in the modified example 2 thereof.
Figure 25:
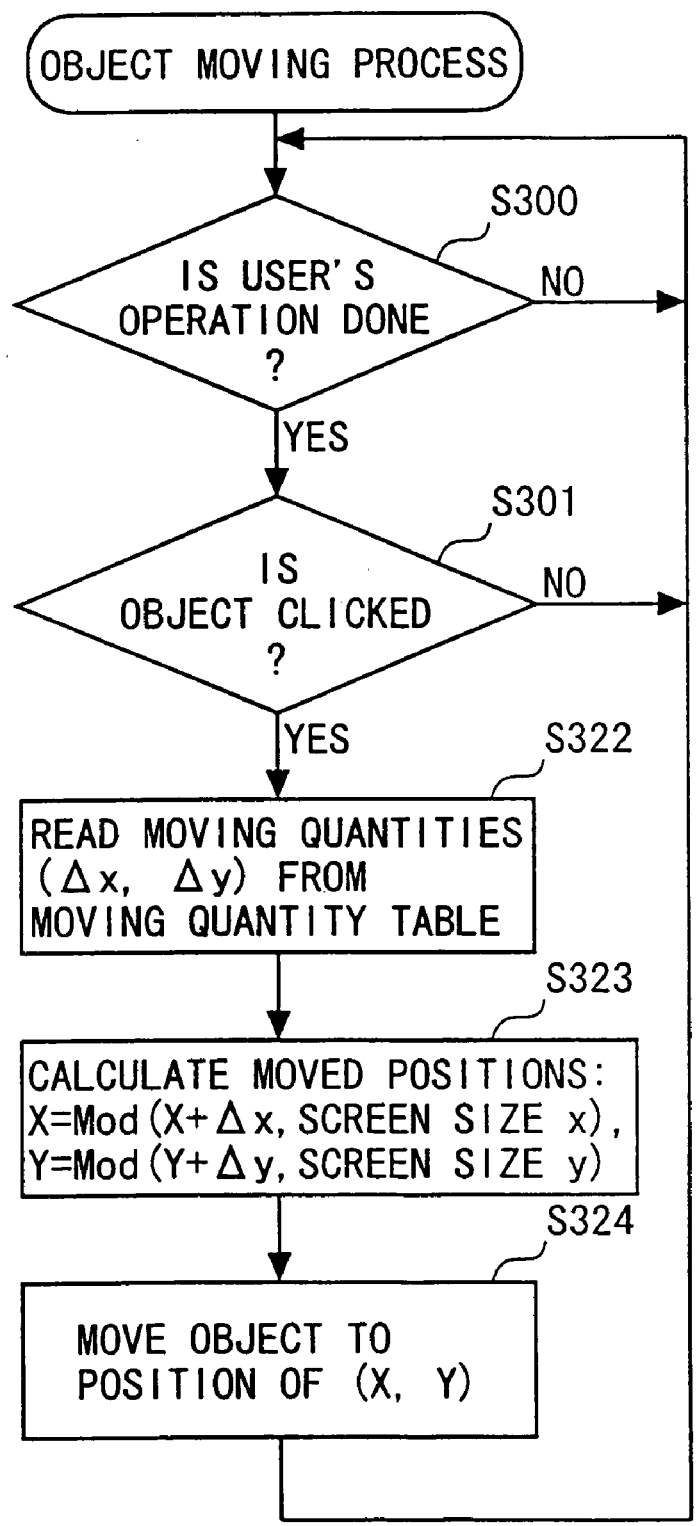
FIG. 25 is a flowchart showing the object moving process in the modified example thereof.
Figure 26:
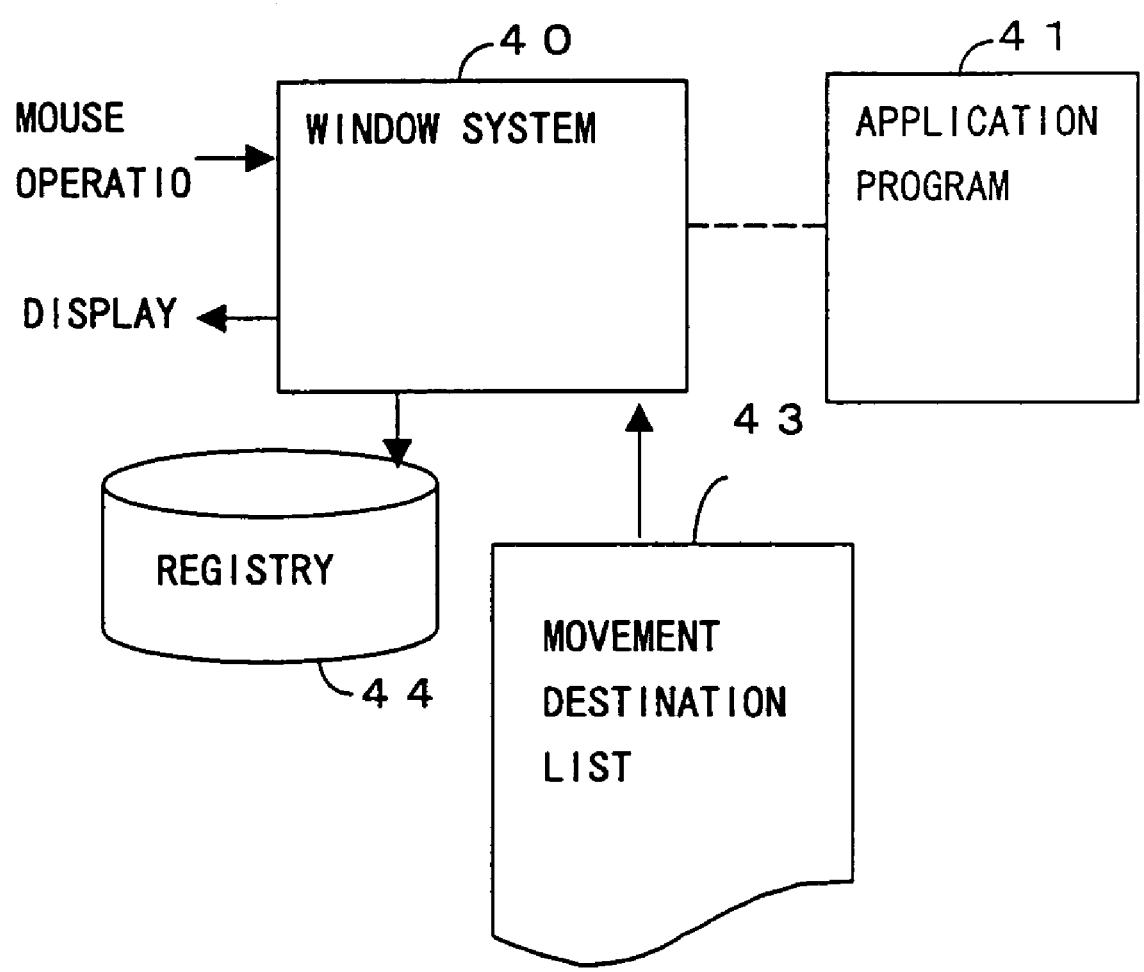
FIG. 26 is a diagram showing a structure of the program in a modified example 3 thereof.
Figure 27:
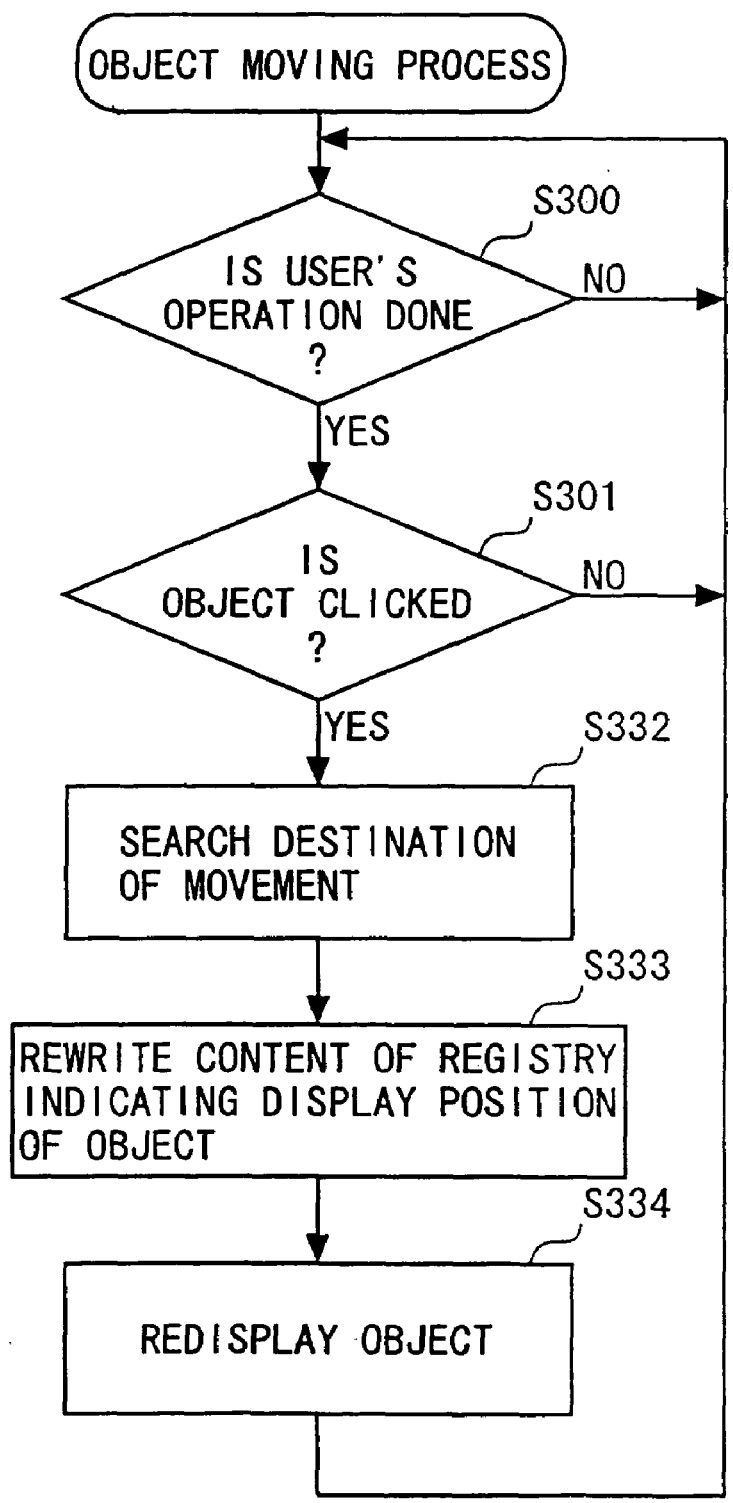
FIG. 27 is a flowchart showing the object moving process in the modified example thereof.

A third embodiment of the present invention will hereinafter be discussed with reference to drawings in FIGS. 18 to 27. FIG. 18 is an explanatory view illustrating an operation of how the object is moved. FIG. 19 is a diagram showing a structure of the program in the third embodiment. FIG. 20 is a diagram showing a data structure of a movement destination list used by the information display system 1 in the third embodiment. FIG. 21 is a flowchart showing steps of a process of moving the object. FIGS. 22 and 23 are flowcharts each showing steps of the object moving process in a modified example 1 of the third embodiment. FIG. 24 is an explanatory view illustrating how the object is moved in a modified example 2 of the third embodiment. FIG. 25 is a flowchart showing steps of the object moving process in the modified example 2 thereof. FIG. 26 is a diagram showing a structure of the program in a modified example 3 of the third embodiment. FIG. 27 is a flowchart showing the object moving process in a modified example 3 thereof.

The first and second embodiments have exemplified the information display system 1 in which plural items of information are displayed in the divided display areas 22, and the dial object 20 for switching the information in this type of information display system 1. The discussion in the third embodiment will be focused on a function of properly moving the object that might be an obstacle against displaying other objects in the above information display system 1. Other configurations are the same as those in the first or second embodiment, and the drawings in FIGS. 1 through 17 will be referred to according to the necessity.

<Object Moving Function>

FIG. 18 is the explanatory view illustrating the operation of how the object is moved. An object representing an automobile and a circular object in FIG. 18.

This circular object embraces what is displayed for indicating a corresponding channel number in, e.g., the display area described above.

The circular object overlays a part of the automobile on the screen 30. Therefore, a part of the object of the automobile is obstructed in its display. In accordance with the third embodiment, there will be explained a function of changing a state as seen on the screen to a state as on the screen 31 by one-touch operation. To be more specific, when the circular object on the screen 30 is clicked by the mouse 16, the information display system 1 in the third embodiment moves the circular object to a specified position and displays it as on the screen 31.

<Architecture of Program>

FIG. 19 shows an architecture of the program executed by the CPU 11 of the information display system 1. In this information display system 1, the program consists of a window system 40 and an application program 41. What is known as the window system 40 may be Windows by Microsoft Corp., in U.S.A.

The window system 40 functions to display the object on the CRT 14 in accordance with an indication of the application program 41. Further, the window system 40 monitors the user's operation involving the use of mouse 16.

The application program 41 responds to the user's operation in accordance with a report 42 given from the window system 40.

When the user clicks a given object, the window system 40 issues the report 42 to the application program 41 indicating the window system 40 to display the object.

The application program 41 receiving this report 42 refers to a movement destination list 43 that defines a destination to which the object is moved, and thus determines the movement destination. Then, the application program 41 gives the window system 40 an indication 44 indicating the movement destination of the object.

Based on this indication 44, the window system 40 displays the object in a position indicated.

<Structure of Movement Destination List 43>

FIG. 20 is a chart showing the movement destination list 43 in which the movement destinations of the object are defined beforehand. This movement destination list 43 consists of records each composed of fields such as [present position], [moved position] and [order of movements].

The field [present position] is stored with a value of 1 in the record corresponding to a present position of the object. Further, the filed [present position] is free in the record that does not correspond to the present position of the object.

The field [moved position] shows a destination to which the object is moved. In the information display system 1 in the third embodiment, nine positions in the display area 22 are defined as the moved positions. For instance, [left upper end] indicates a position at a left upper corner in the display area 22. Similarly, [right upper end] indicates a position at a right upper corner in the display area 22. Hereinafter, [left lower end] and [middle lower end] likewise indicate positions.

The field [order of movements] shows the order of movement when the object concerned is clicked. For example, when the present position is [left upper end], the order of movement is 1. At this time, when the object is clicked, that object is moved to [right upper end] (the order of movement is 2) of which [order of movement] is defined next to the present position.

<Function>

FIG. 21 shows the object moving process in the application program 41. The CPU 11 executes this process, hereby providing a function as the information display system 1 in the third embodiment.

In this object moving process, the CPU 11 monitors the user's operation via the window system 40 (S300).

When the user's operation is detected (Yes judgement in S300), the CPU 11 judges whether or not the object is clicked (S301). If the object is not clicked, the CPU 11 sets the control back to S300, wherein the CPU 11 monitors the user's operation.

Whereas if the object is clicked, the CPU 11 obtains the present position of the object (S302). The present position can be obtained by inquiring the window system 40.

Next, the CPU 11 obtains a position of the movement destination with reference to the movement destination list 43 (S303).

Subsequently, the CPU 11 indicates the window system 40 to move the object (S304). The object is thereby moved to a next movement destination defined in the movement destination list 43.

Thereafter, the CPU 11 sets the control back to S300, in which the CPU 11 monitors the user's operation.

As discussed above, in the information display system 1 in the third embodiment, when the object is clicked, the clicked object is moved to the predetermined movement destination. Therefore, if one object overlays other object, the user is able to move this object by the clicking of the mouse 16. Accordingly, the labor for dragging as needed in the prior art can be simplified. Further, unlike the prior art, the display architecture needs nether the deletion of the overlaid object nor the icon symbolization, and hence the object required to be displayed can be displayed so as not to obstruct other objects.

Further, when the information display system 1 demonstrated in the first embodiment implements the processes in this embodiment, the double-clicks on the circular object are used for changing the display area, and therefore a contrivance may be such that the clicking operation is conducted by use of, e.g., the right button so as not to overlap with the clicking in the first embodiment.

Modified Example 1 of Moving Process

FIG. 22 shows a modified example 1 of the object moving process. In the information display system 1 in the third embodiment, the CPU 11 determines the movement destination of the object with reference to the movement destination list 43. The embodiment of the present invention is not, however, limited to the above steps of determining the movement destination. For instance, in the steps shown in FIG. 22, the movement target object is moved to a free area where no other object is displayed.

Referring to FIG. 22, the judgements in S300 and S301 are the same as those in FIG. 21, and hence their repetitive explanations are omitted.

Referring again to FIG. 22, when the click on the object is detected, the CPU 11 searches a free area on the screen (S312) Next, the application program 41 instructs the window system 40 to move the object to that free area (S313). The object is thereby moved to the free area. Thereafter, the CPU 11 set the control back to S300, wherein the CPU 11 monitors the user's operation.

FIG. 23 shows details of a free area searching process. the free area can be recognized by the application program 41 inquiring the window system 40.

The CPU 11, to start with, inquires the window system 40 and obtains a list of the objects management by the window system 40 (S3121).

Next, the CPU 11 inquires the window system 40 and gets areas where the respective objects exist on the screen (S3122).

Subsequently, the CPU 11 obtains areas excluding the object-existing areas on the screen (S3123). This involves the use of pixel arrays on the screen, e.g., 1024×1024 arrays, and those areas can be obtained by putting check marks on the pixels corresponding to the object-existing areas on the screen and connecting the pixels with no check mark. Such a connection can be expressed by use of, e.g., Run-Length method known as an image processing method.

Next, the CPU 11 obtains a maximum free area (in which a run lengths is maximum in X- and Y-directions) from the above areas, and determines this area as a free area (S3124). Thereafter, the CPU 11 finishes the free area searching process.

Note that as a method other than the method described above, for example, the CPU 11 may obtain a free area from data on an unillustrated VRAM by scanning the VRAM.

Modified Example 2 of Moving Process

FIGS. 24 and 25 show a modified example 2 of the object moving method. In the third embodiment, the movement destination list 43 is stored with the movement destinations of the object and the order of the movements, and the movement target object is moved according to this order. As a substitute for this mode, (X- and Y-directional) moving quantities of the object are retained, and the movement target object may be moved by these moving quantities.

FIG. 24 illustrates an object that is moved in this way. When the user clicks the circular object with an encircled numeral of 2, this circular object is moved a predetermined distance on the screen. If a moving position shifts beyond the display area in the X- or Y-direction, the moving position is set back by one screen. Thus, a moving locus of the moving circular object is depicted by dotted arrow lines.

FIG. 25 shows a process executed by the CPU in that case. The judgements in S300 and S301 are the same as those in FIG. 21, and hence their repetitive explanations are omitted.

Referring to FIG. 25, when the click on the object is detected, the CPU 11 reads moving quantities ($\Delta x$, $\Delta y$) from an unillustrated moving quantity table stored in the memory 12 (S322).

Next, the CPU 11 calculates a moving position (S323). The moving position can be obtained by the following formulae.

After-movement $X$ coordinates=Mod (before-movement $X$ coordinates+$\Delta x$, $X$-directional screen size)

After-movement $Y$ coordinates=Mod (before-movement $Y$ coordinates+$\Delta y$, $Y$-directional screen size)

where Mod (A, B) is a remainder when A is divided by B. Accordingly, the coordinates after being moved invariably fall within the screen range.

Next, the CPU 11 moves the movement target object to X, Y after the movement (S324).

The moving quantity table may individually prepared for every object and may also be shared with a plurality of objects. For example, one kind of moving quantity table is prepared in the information display system 1 and may be shared with all the objects.

Further, one kind of moving quantity table is prepared in the program for displaying the plurality of objects and may be shared with the objects displayed in that program.

Modified Example 3 of Moving Process

In the third embodiment discussed above, the object is moved based on the processing of the application program 41 for displaying the object. The embodiment of the present invention is not however, confined to this mode of moving the object on the basis of the indication given from the application program 41.

FIG. 26 shows an architecture of a program for moving the object by the processing of the window system 40 through no intermediary of the processing of the application program 41 in the information display system 1 (the modified example 3).

In the information display system 1, when detecting that the users manipulates the mouse 16 with respect to a specified object, the window system 40 refers to the movement destination list 43. Then, the window system 40 determines a destination to which the object is moved on the basis of the definitions in the movement destination list 43. The window system 40 writes the movement destination to a window system database (which is, for instance, called Registry in Windows defined as a window system by Microsoft Corp., in U.S.A) for showing display positions of the objects. Then, the window system 40 re-displays the object. This object is thereby displayed in the movement destination.

FIG. 27 shows the processing of the window system 40 that is executed by the CPU 11 in this case. Referring to FIG. 27, the judgements in S300 and S301 are the same as those in FIG. 21, and hence the repetitive explanations are omitted.

Referring again to FIG. 27, when detecting the click on the object, the CPU 11 searches a destination where the object is moved (S332). In this case, the movement destination may be, as in the third embodiment, defined in the movement destination list 43 or in the moving quantity table as in the modified example 2. Furthermore the movement destination may be decided to a free area where no other object is displayed shown in the modified example of the third embodiment.

Next, the CPU 11 rewrites a content of Registry indicating the display positions of the objects (S333). Namely, the CPU 11 changes the coordinates of the display position to coordinates of the movement destination.

Subsequently, the CPU makes the window system 40 re-display the object (S334). The object is thereby displayed in that movement destination.

Note that Windows by Microsoft Corp, in U.S.A is assumed as the window system 40, and Registry is assumed as the database of the window system in this modified example. The embodiment of the present invention is not, however, limited to Windows. The present invention can be embodied in X Window System typical in UNIX system, and also in OSF (Open Software Foundation)/Motif.

Modified Example of Hardware

In the embodiment discussed above, the clicking by the mouse 16 is detected as the indication of moving the operation target. The embodiment of the present invention is not, however, restricted to this mode. Other pointing device, e.g., a touch panel is used as a substitute for the mouse 16, and one-touch operation on the object may also be detected. Further, the object may be moved based on specific signals of a remote controller utilizing electromagnetic waves such as infrared-rays etc. That is, the information display system 1 includes a light receiving unit for receiving the electromagnetic waves from this remote controller, and, when the light receiving unit receives the signal (electromagnetic waves) generated by pushing a given push button of the remote controller, a specified object may also be moved.

Other Modified Examples

In the third embodiment, the movement destination list 43 is prepared for every object. Instead of this, the movement destination list 43 may be shared with the plurality of objects. For example, one kind of movement destination list 43 is prepared in the information display system 1 and may also be shared with all the objects.

Further, one kind of movement destination list 43 is prepared in the program for displaying the plurality of objects and may be shared with the objects displayed in this program.

What is claimed is:

1. An information display system comprising:
    a display unit displaying a circumferential turn object which includes an indicator, indicating any one piece of identifying information among pieces of identifying information arranged along substantially a circumferential shape, circumferentially turning about the center of the circumferential shape;
    a detection unit detecting an operation of said operation unit with respect to said circumferential turn object; and
    a control unit circumferentially turning said indicator in accordance with the detected operation;
    wherein said operation unit is a pointing device having at least two pieces of buttons, and
    said indicator turns counterclockwise by depressing said first button and turns clockwise by depressing said second button.

2. An information display system according to claim 1, wherein said two buttons are right and left buttons,
    said first button is the left button, and
    said second button is the right button.

3. An information display system comprising:
    a communication unit obtaining information by accessing a network;
    a display unit displaying the information obtained;
    a correspondence storage module making an item of identifying information correspond to a specified item of information; and
    a control unit displaying, in a display area, the information obtained from the network via said communication unit,
    wherein said display unit includes a display area for displaying the information and a circumferential turn object having an indicator, indicating any one piece of identifying information among pieces of identifying information arranged along substantially a circumferential shape, circumferentially turning about the center of the circumferential shape, and
    said control unit detects an operation of said operation unit with respect to said circumferential turn object, circumferentially turns said indicator in accordance with the operation of said operation unit, and displays the information corresponding to the identifying information indicated in a position to which said indicator is circumferentially turned,
    wherein said operation unit is a pointing device having at least two pieces of buttons, and
    said indicator turns counterclockwise by depressing said first button and turns clockwise by depressing said second button.

4. An information display system according to claim 3, wherein said turn object has pieces of information arranged along said substantially circumferential shape and each representing the number of divisions by which the display area of said display unit is divided, and
    when said indicator is turned to the position of indicating the information representing the number of divisions, the display area is divided by this number of divisions, and plural items of information are displayed in the divided display areas.

5. A storage medium readable by a machine tangible embodying a program of instructions executable by the machine to perform method steps comprising:
    displaying a circumferential turn object including an indicator, for indicating any one piece of identifying information among pieces of identifying information arranged along substantially a circumferential shape, circumferentially turning about the center of the circumferential shape;
    detecting an operation with respect to said circumferential turn object; and
    circumferentially turning said indicator in accordance with the detected operation,
    wherein the operation is an operation of a pointing device having at least two pieces of buttons, and
    an indicator is turned counterclockwise by depressing said first button and turned clockwise by depressing said second button.

6. A storage medium readable by a machine tangible embodying a program according to claim 5, of instructions executable by the machine, wherein said two buttons are right and left buttons,
    said first button is the left button, and
    said second button is the right button.

7. A storage medium readable by a machine, tangible embodying a program of instructions executable by the machine to perform method steps comprising:
    obtaining information by accessing a network;
    forming a display area for displaying the information;
    displaying a circumferential turn object having an indicator, for indicating any one piece of identifying information among pieces of identifying information arranged along substantially a circumferential shape, circumferentially turning about the center of the circumferential shape;
    making the identifying information corresponding to a specified item of information;
    detecting an operation with respect to said circumferential turn object;
    circumferentially turning said indicator in accordance with the detected operation; and
    displaying, in said display area, the information corresponding to the identifying information indicated in a position to which said indicator is circumferentially turned;
    wherein the operation is an operation of a pointing device having at least two pieces of buttons, and an indicator is turned counterclockwise by depressing said first button and turned clockwise by depressing said second button.

8. A storage medium readable by a machine tangible embodying a program according to claim 7, of instructions executable by the machine, wherein said turn object has pieces of information arranged along substantially a circumferential shape and each representing the number of divisions by which the display area of said display unit is divided, and when said indicator is turned to the position of indicating the information representing the number of divisions, the display area is divided by this number of divisions, and plural items of information are displayed in the divided display areas.

9. An information display method comprising:

displaying a circumferential turn object including an indicator, for indicating any one piece of identifying information among pieces of identifying information arranged along substantially a circumferential shape, circumferentially turning about the center of the circumferential shape;

detecting an operation with respect to said circumferential turn object; and circumferentially turning said indicator in accordance with the detected operation;

wherein the operation is an operation of a pointing device having at least two pieces of buttons, and an indicator is turned counterclockwise by depressing said first button and turned clockwise by depressing said second button.

10. An information display method according to claim 9, wherein said two buttons are right and left buttons, said first button is the left button, and said second button is the right button.

11. An information display method comprising:

obtaining information by accessing a network;

forming a display area for displaying the information;

displaying a circumferential turn object having an indicator, for indicating any one piece of identifying information among pieces of identifying information arranged along substantially a circumferential shape, circumferentially turning about the center of the circumferential shape;

making the identifying information corresponding to a specified item of information;

detecting an operation with respect to said circumferential turn object;

circumferentially turning said indicator in accordance with the detected operation; and displaying, in said display area, the information corresponding to the identifying information indicated in a position to which said indicator is circumferentially turned;

wherein the operation is an operation of a pointing device having at least two pieces of buttons, and an indicator is turned counterclockwise by depressing said first button and turned clockwise by depressing said second button.

12. An information display method according to claim 11, wherein said turn object has pieces of information arranged along substantially a circumferential shape and each representing the number of divisions by which the display area of said display unit is divided, and when said indicator is turned to the position of indicating the information representing the number of divisions, the display area is divided by this number of divisions, and plural items of information are displayed in the divided display areas.

* * * * *